(12) United States Patent
Bohringer et al.

(10) Patent No.: US 9,409,162 B2
(45) Date of Patent: Aug. 9, 2016

(54) ACTIVATED CARBON WITH A METAL BASED COMPONENT

(75) Inventors: Bertram Bohringer, Wuppertal (DE); Ilsebill Eckle, Gelsenkirchen (DE); Peter Wasserscheid, Erlangen (DE); Daniel Roth, Erlangen (DE)

(73) Assignee: BLUCHER GMBH, Erkrath (DE)

( * ) Notice: Subject to any disclaimer, the term of this patent is extended or adjusted under 35 U.S.C. 154(b) by 45 days.

(21) Appl. No.: 14/238,347

(22) PCT Filed: May 25, 2012

(86) PCT No.: PCT/EP2012/002246
§ 371 (c)(1),
(2), (4) Date: May 12, 2014

(87) PCT Pub. No.: WO2013/023715
PCT Pub. Date: Feb. 21, 2013

(65) Prior Publication Data
US 2014/0302981 A1   Oct. 9, 2014

(30) Foreign Application Priority Data

Aug. 14, 2011 (DE) .................. 10 2011 110 103
Sep. 23, 2011 (DE) .................. 10 2011 114 133

(51) Int. Cl.
| | | |
|---|---|---|
| C01B 31/08 | (2006.01) | |
| B01J 31/12 | (2006.01) | |
| B01D 39/06 | (2006.01) | |
| B01D 39/08 | (2006.01) | |
| B01D 39/16 | (2006.01) | |
| B01D 39/20 | (2006.01) | |
| B01J 20/20 | (2006.01) | |
| B01D 53/02 | (2006.01) | |
| B01J 20/28 | (2006.01) | |
| B01J 20/32 | (2006.01) | |
| A41D 13/00 | (2006.01) | |

(52) U.S. Cl.
CPC ........... *B01J 31/121* (2013.01); *A41D 13/0002* (2013.01); *B01D 39/06* (2013.01); *B01D 39/083* (2013.01); *B01D 39/1615* (2013.01); *B01D 39/1623* (2013.01); *B01D 39/1676* (2013.01); *B01D 39/2058* (2013.01); *B01D 53/02* (2013.01); *B01J 20/20* (2013.01); *B01J 20/2808* (2013.01); *B01J 20/28066* (2013.01); *B01J 20/28071* (2013.01); *B01J 20/28073* (2013.01); *B01J 20/28083* (2013.01); *B01J 20/3204* (2013.01); *B01J 20/3236* (2013.01); *B01J 20/3255* (2013.01); *B01J 20/3265* (2013.01); *B01J 20/3287* (2013.01); *C01B 31/083* (2013.01); *C01B 31/084* (2013.01); *B01D 2239/0464* (2013.01); *B01D 2239/0485* (2013.01); *B01D 2239/065* (2013.01); *B01D 2239/0654* (2013.01); *B01D 2239/0681* (2013.01); *B01D 2239/1208* (2013.01); *B01D 2239/1216* (2013.01); *B01D 2239/1241* (2013.01); *B01D 2239/1291* (2013.01); *B01D 2253/102* (2013.01); *B01D 2253/1122* (2013.01); *B01D 2253/25* (2013.01); *B01D 2253/306* (2013.01); *B01D 2253/308* (2013.01); *B01D 2253/342* (2013.01); *C01P 2004/51* (2013.01); *C01P 2004/60* (2013.01); *C01P 2006/12* (2013.01); *C01P 2006/14* (2013.01); *C01P 2006/17* (2013.01)

(58) Field of Classification Search
CPC .. C01B 31/083; C01B 31/089; C01P 2006/17
See application file for complete search history.

(56) References Cited

U.S. PATENT DOCUMENTS

| | | |
|---|---|---|
| 2010/0313759 A1 | 12/2010 | Bones |
| 2013/0030233 A1 | 1/2013 | Boeing et al. |

FOREIGN PATENT DOCUMENTS

| | | |
|---|---|---|
| CN | 101928394 A | 12/2010 |
| DE | 102007062667 A1 | 5/2009 |
| DE | 102009029284 A1 | 3/2011 |
| JP | 2009214094 A | 9/2009 |
| WO | 2008110233 A1 | 9/2008 |
| WO | 2012046057 A2 | 4/2012 |

*Primary Examiner* — Stuart Hendrickson
(74) *Attorney, Agent, or Firm* — Edward E. Sowers; Brannon Sowers & Cracraft PC

(57) ABSTRACT

The invention relates to an activated carbon, in particular an activated carbon with reactive and/or catalytic activity, said activated carbon being in the form of discrete activated carbon particles, preferably in a spherical and/or grain form. The activated carbon is provided with and/or comprises at least one metal component which has at least one metal-containing ionic liquid (IL) containing, in particular metal ions, preferably based on a metal compound. The invention also related to methods for producing said activated carbon, to the uses thereof and to materials provided herewith.

15 Claims, 4 Drawing Sheets

ACTIVATED CARBON WITH A METAL BASED COMPONENT

CROSS-REFERENCES TO RELATED APPLICATIONS

This application is a National Stage filing of International Application PCT/EP 2012/002246, filed May 25, 2012, claiming priority to German Applications No. DE 10 2011 110 103.2 filed Aug. 14, 2011, and No. DE 10 2011 114 133.6 filed Sep. 23, 2011, entitled "ACTIVATED CARBON WITH A METAL BASED COMPONENT" The subject application claims priority to PCT/EP 2012/002246, and to German Applications No. DE 10 2011 110 103.2 and DE 10 2011 114 133.6 and incorporates all by reference herein, in their entirety.

BACKGROUND OF THE INVENTION

The present invention relates to the technical field of adsorptive materials based on activated carbon which have in particular been provided with catalytic and/or reactive constituents.

The present invention relates in particular to an activated carbon as such, in particular an activated carbon which has been provided with reactive and/or catalytic constituents, where the activated carbon is present in the form of discrete activated carbon particles, preferably having a spherical or grain shape, and the activated carbon has been provided with at least one metal component.

In addition, the present invention relates to processes for producing the activated carbon according to the invention which has been provided with at least one metal component.

The present invention additionally relates to uses of the activated carbon of the invention for the production of all types of protective materials and for the production of all types of filters and filter materials. The present invention additionally relates to uses of the activated carbon of the invention as sorption stores for gases or liquids or in the field of catalysis as catalyst or catalyst support or for chemical catalysis. The present invention additionally relates to uses of the activated carbon of the invention in or as gas sensors or in fuel cells and also for sorptive, in particular adsorptive, applications. The present invention also relates to uses of the activated carbon according to the invention for gas purification or gas treatment and also for the removal of pollutants. In addition, the present invention relates to a use of the activated carbon according to the invention for the treatment or provision of clean room atmospheres.

The present invention also relates to protective materials as such which have been produced using the activated carbon according to the invention or comprise the latter. In addition, the present invention relates to filters or filter materials which have been produced using the activated carbon according to the invention or which comprise the activated carbon of the invention.

Finally, the present invention relates to a process for the purification or treatment of gases.

Owing to its quite unspecific adsorptive properties, activated carbon is the most widely used adsorbent. Legal obligations but also the increasing awareness of responsibility for the environment are leading to an increasing demand for activated carbon.

Activated carbon is generally obtained by carbonization (synonymously also referred to as low-temperature carbonization, pyrolysis, burning, etc.) and subsequent activation of carbon-containing starting compounds, with preference being given to starting compounds which lead to economically feasible yields. The weight losses due to elimination of volatile constituents during carbonization and due to subsequent burning during activation are considerable. For further details regarding activated carbon production, preference may be made, for example, to H. v. Kienle and E. Bäder, "Aktivkohle and ihre industrielle Anwendung", Enke Verlag Stuttgart, 1980.

The nature of the activated carbon produced, viz. fine- or coarse-poured, solid or crumbly, etc., also depends on the starting material. Conventional starting materials are coconut shells, wood charcoal and wood (e.g. wood wastes), peat, hard coal, pitches and also particular plastics which play a particular role in, inter alia, the production of woven activated carbon fabrics.

Activated carbon is used in various forms: powdered carbon, crushed carbon or carbon granules, shaped carbon and since the end of the 1970s also spherical activated carbon ("carbon beads"). Compared to other forms of activated carbon such as powdered carbon, crushed carbon, carbon granules and shaped carbon and the like, spherical carbon has a series of advantages which make it valuable or even indispensable for particular applications: it is free-flowing, abrasion-resistant, free of dust and hard. Owing to their specific shape but also because of the high abrasion resistance, carbon beads are, for example, highly sought after for particular fields of use.

Carbon beads are nowadays usually produced by multistage and very complicated processes. The best-known process comprises production of spheres of hard coal tar pitch and suitable asphalt-type residues from the petrochemicals industry, which are oxidized to make them infusible and subsequently subjected to low-temperature carbonization and activated. For example, the carbon beads can also be produced in a multistage process starting out from bitumen. These multistage processes are very costly and the associated high price of these carbon beads prevents many applications in which the carbon beads would actually have to be preferred because of their properties.

WO 98/07655 A1 describes a process for producing activated carbon spheres, in which a mixture comprising a distillution residue from diisocyanate production, a carbon-containing processing auxiliary and optionally one or more further additives is firstly processed to give free-flowing spheres and the spheres obtained in this way are subsequently carbonized and then activated.

The production of carbon beads by low-temperature carbonization and subsequent activation of new or used ion exchangers containing sulfonic acid groups or by low-temperature carbonization of ion exchanger precursors in the presence of sulfuric acid and subsequent activation, in which the sulfonic acid groups or the sulfuric acid have the function of a crosslinker, is also known from the prior art. Such processes are described, for example, in DE 43 28 219 A1 and in DE 43 04 026 A1 and also in DE 196 00 237 A1 including the German supplementary application DE 196 25 069 A1.

Furthermore, processes in which the production of activated carbon, in particular carbon beads, is carried out by low-temperature carbonization and subsequent activation of sulfonated divinylbenzene-crosslinked polystyrenes (i.e. sulfonated styrene-divinylbenzene copolymers) are known from the prior art (cf., for example, DE 10 2007 050 971 A1).

However, in specific applications, it is not only the geometry and the external shape of the activated carbon which is of critical importance, but also its porosity, in particular the total pore volume and the adsorption capacity and also the distribution of the pores, i.e. the proportion of micropores, mesopores and macropores based on the total pore volume; in particular, the porosity can be controlled by the choice of starting materials and the process conditions. For the purposes of the present invention, the term micropores refers to pores having pore diameters of less than 2 nm, while the term mesopores refers to pores having pore diameters in the range from 2 nm (i.e. 2 nm inclusive) to 50 nm inclusive and the term macropores refers to pores having pore diameters of greater than 50 nm (i.e. >50 nm).

Owing to its good adsorptive properties, activated carbon is used for many applications: thus, activated carbon is used, for example, in medicine or pharmacy and also in the food industry. Activated carbon is also widely used for filter applications (e.g. filtration of gases and liquids, removal of undesirable or harmful or toxic gases, etc.).

In particular, activated carbon can be used in adsorption filter materials, especially in protective materials to protect against poisons such as chemobiological weapons, for example ABC protective clothing. For this purpose, air-permeable and water vapor-permeable protective suits to protect against chemical weapons are particularly well known; such air-permeable and water vapor-permeable protective suits often have an adsorption filter layer comprising activated carbon, which absorb the chemical poisons.

To increase the adsorption performance, permeable adsorptive filter systems, in particular ones based on activated carbon, are often provided with a catalytically active or reactive component by impregnating the activated carbon with, for example, a biocidal or biostatic catalyst, in particular one based on metals or metal compounds.

Such a protective material is described, for example, in DE 195 19 869 A1, which contains a multilayer, textile, gas-permeable filter material having an adsorption layer based on activated carbon, in particular in the form of carbonized fibers, which is impregnated with a catalyst from the group consisting of copper, cadmium, platinum, palladium, mercury and zinc in amounts of from 0.05 to 12% by weight, based on the activated carbon material.

A specific impregnation used in this context is, for example, an ABEK impregnation which has a catalytic or degrading effect in respect of specific toxic substances. In this context, type A relates to particular organic gases and vapors having a boiling point of >65° C., for example cyclohexane. Type B relates to particular inorganic gases and vapors, for example hydrogen cyanide. Type E relates to a degrading or protective action in respect of sulfur dioxide and other acidic gases and vapors. Finally, type K relates to a protective function in respect of ammonia and organic ammonia derivatives. For more detailed information, reference may be made to the relevant European Standard EN 14387 (January 2004).

A disadvantage of conventional impregnations of activated carbon with metals or metal salts is, in particular, the fact that part of the adsorption capacity of the activated carbon, which is required for adsorption and thus for making harmful chemical substances unproblematical, is lost as a result of the impregnation. Thus, the performance of the activated carbon is adversely affected by the processes known from the prior art for impregnating the activated carbon with metals or metal salts. Furthermore, the desired effectiveness is not always achieved by a conventional impregnation. The problem of breakthrough of poisons and chemical weapons at high concentrations is also not always solved by this principle; on the other hand, at very low concentrations of harmful substances or undesirable gases which are to be removed (e.g. in air treatment for clean room conditions), the desired efficiency is often not achieved since adsorption commences only at higher concentrations. Finally, the conventional process of impregnation with metals or metal salts requires relatively larger amounts of the impregnate since a large part of the impregnate present as solid is not available during adsorption, in particular when relatively thick layers of the impregnate are present in the pore system of the activated carbon, in particular in the form of crystallites.

BRIEF SUMMARY OF THE INVENTION

It is therefore an object of the present invention to provide absorptive materials having reactive and/or catalytic properties in the form of activated carbon and a corresponding production process, with the abovementioned disadvantages of the prior art being at least largely avoided or else at least decreased.

In particular, the present invention should make available an activated carbon which has been provided with reactive or catalytic constituents, with, in particular, the effectiveness of the activated carbon provided being improved further in respect of the removal or sorption of harmful substances or the like compared to the prior art. In particular, the present invention should make available an activated carbon material in which it is ensured that the adsorptive properties of the activated carbon are not adversely affected by the specific reactive or catalytic constituents. In addition, the present invention should make available an efficient process on the basis of which the activated carbon of the invention can be obtained.

As the applicants have now discovered in a totally surprising way, the abovementioned object on which the present invention is based can be solved in an unexpected way by an activated carbon in the form of discrete activated carbon particles being provided according to the present invention with a specific metal component which comprises at least one metal-containing ionic liquid (IL), in particular an ionic liquid containing metal ions, preferably on the basis of a metal compound. In other words, the basic idea underlying the present invention is to provide the metal component which is critical for the reactive or catalytic properties of the activated carbon according to the invention with an ionic liquid (IL) or to use an ionic liquid (IL) into which a metal, in particular in ionic form on the basis of a metal compound which is soluble in and/or can be dissociated in the ionic liquid (IL), e.g. a metal salt, is introduced, where the activated carbon according to the invention is, in order to achieve the desired purpose, provided with or impregnated with such a metal component or ionic liquid (IL).

To achieve the abovementioned object, the present invention thus proposes, according to a first aspect of the present invention, the activated carbon of the invention, in particular activated carbon provided with reactive or catalytic constituents, where the activated carbon is present in the form of discrete activated carbon particles, preferably having a spherical or grain shape, and where the activated carbon has been provided with at least one metal component using an ionic liquid (IL), as per claim 1. Further, particularly advantageous embodiments of the activated carbon of the invention are subject matter of the respective dependent claims.

The present invention further provides, according to a second aspect of the present invention, the processes of the invention for producing the activated carbon which has been provided with at least one metal component of the type according to the invention as per the independent process claims. Further, particularly advantageous embodiments of the processes of the invention are subject matter of the relevant dependent process claims.

The present invention further provides, according to a third aspect of the present invention, the uses according to the invention as are defined in the relevant use claims.

The present invention additionally provides, according to a fourth aspect of the present invention, the protective materials of the invention, in particular for the civil or military sector, in particular protective clothing, as per the respective independent claim.

The present invention additionally provides, according to a fifth aspect of the present invention, filters and filter materials, in particular for the removal of harmful substances, odorous substances and poisons of all types, as per the relevant independent claim. Further, particularly advantageous embodiments of the filters and filter materials of the invention are subject matter of the respective dependent claims.

Finally, the present invention provides, according to a sixth aspect of the present invention, the process of the invention for purifying or treating gases as per the relevant independent claim. Further, particularly advantageous embodiments of the process of the invention according to this aspect of the present invention are subject matter of the respective dependent process claim.

It goes without saying that in the following description of the present invention those embodiments, variants, advantages, examples or the like which are, to avoid unnecessary repetition, mentioned in the following only in respect of a single aspect of the invention of course also apply in respect of the remaining aspects of the invention without this needing to be expressly mentioned.

Furthermore, it goes without saying that for the values, numbers and ranges indicated below, the respective values, numbers and ranges indicated are not to be interpreted as a restriction; it will be obvious to a person skilled in the art that, depending on the individual case or depending on the application, it is possible to depart from the ranges or values indicated without going outside the scope of the present invention.

In addition, all values or parameters or the like indicated below can essentially be measured or determined by standardized or explicitly indicated methods of determination or else by means of methods of determination or measurement with which a person skilled in this field will be familiar.

Furthermore, in the case of all relative measurements or percentages indicated below, in particular weight-based amounts, it should be noted that these values/numbers can be selected or combined within the scope of the present invention by a person skilled in the art in such a way that the resulting total, optionally with inclusion of further components or constituents, in particular as defined below, is always 100% or 100% by weight. However, this is self-evident to a person skilled in the art.

DETAILED DESCRIPTION OF THE INVENTION

Figure 1:
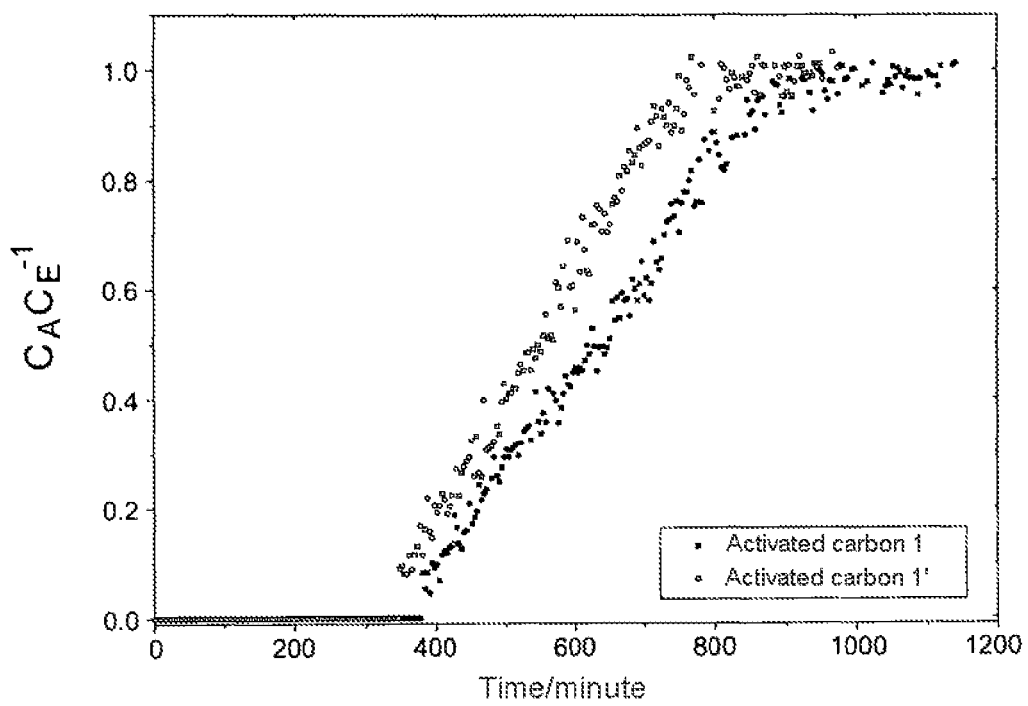
FIG. 1 provides a graphical depiction of the breakthrough curves of ammonia ($NH_3$) for beds of an activated carbon according to the invention (activated carbon 1) which has a metal component comprising a metal-containing ionic liquid (IL) in comparison with a noninventive activated carbon (activated carbon 1') having a conventional metal salt impregnation.

This having been said, the present invention will be described in more detail below.

According to a first aspect of the present invention, the present invention provides an activated carbon, in particular activated carbon which has been provided with reactive and/or catalytic constituents, where the activated carbon is present in the form of discrete activated carbon particles, preferably having a spherical and/or grain shape, and the activated carbon has been provided with at least one metal component. In the activated carbon of the invention, the metal component comprises at least one metal-containing ionic liquid (IL), in particular an ionic liquid containing metal ions, preferably on the basis of a metal compound. In other words, an ionic liquid (IL) which contains at least one metal, in particular in the form of a metal ion, preferably on the basis of a metal compound, is used for the purposes of the present invention as metal component with which the activated carbon is provided.

As indicated above, the fundamental idea forming the basis of the present invention is thus to use, in a targeted manner, an ionic liquid (IL) which contains metals or metal ions, preferably at least one metal compound, for providing an activated carbon with a metal component in order to make available an active carbon having reactive and/or catalytic properties, where the activated carbon of the invention is, in particular, provided with the metal component in such a way that a coating or wetting or impregnation of the activated carbon with the metal-containing ionic liquid (IL) is present. In this context, both the external and internal surface structure including the respective pores, in particular micropores, mesopores and/or macropores, of the activated carbon of the invention are at least partly and/or in sections in contact with the metal-containing ionic liquid (IL) and thus with the metal component or are at least partly wetted or impregnated therewith. Without wishing to be restricted to this theory, the metal-containing ionic liquid (IL) or the metal component form, so to speak, a reactive or catalytic layer which has chemisorptive and/or physisorptive properties and supplements the physisorptive properties of the activated carbon on the activated carbon surface.

On the basis of this concept on which the present invention is based, an activated carbon according to the invention which has excellent properties in respect of the sorption of a variety of harmful substances to be removed or a variety of interfering and sometimes toxic gases, e.g. chemical poisons or weapons, is made available in a completely surprising way.

On the basis of the concept underlying the invention, according to which the metal component used comprises a metal-containing ionic liquid (IL), in particular an ionic liquid containing metal ions, preferably on the basis of a metal compound, particularly homogeneous and uniform modification or impregnation of the activated carbon, in particular over the entire pore spectrum, is achieved according to the invention since the metal-containing ionic liquid (IL) or ionic liquid containing metal ions can penetrate particularly well into the pore system and ensure uniform wetting of the pore surface there. It is particularly surprising according to the invention that the pore system of the activated carbon is not or at least essentially not adversely affected in respect of adsorption, in particular physisorption, of harmful substance. In other words, the activated carbon of the invention has, after being provided with the metal component, a high BET surface area accessible to adsorption of harmful substances, in particular by physisorption, so that the fundamental properties of the activated carbon are retained as such even on provision with the metal component, which was not foreseeable.

The activated carbon consequently combines both chemisorptive and physisorptive properties in a single material and is able to bind the sorbates or the substance to be sorbed, reliably and irreversibly or permanently, in contrast to unimpregnated activated carbon.

In addition, the modification or impregnation of the activated carbon with the metal component as provided by the invention prevents crystal or crystallite formation in the pore system which leads to blockages in the pore system, as often occurs in the prior art, for example by crystallization of metal salts, since, firstly, the metals or metal compounds used are permanently dissolved or dissociated in the ionic liquid (IL) and, secondly, the ionic liquid (IL) remains, owing to its very specific physicochemical properties, permanently in the liquid state on the surface of the external and internal structures of the activated carbon, which counters crystallization processes. In contrast to the metal salt impregnation customary in the prior art, according to the present invention the occurrence of blockages in the pore structure of the activated carbon is prevented even in the case of highly microporous activated carbon, which improves the performance of the activated carbon of the invention still further.

The particularly homogeneous or uniform modification or impregnation of the activated carbon of the invention with the metal-containing ionic liquid (IL), in particular ionic liquid containing metal ions, which is responsible for the reactive or catalytic modification, in the manner of a wetting liquid layer also effects a further improvement in the performance of the activated carbon of the invention in respect of the sorption or the degradation of substances to be removed, in particular since the activated carbon of the invention has a large part of its surface with combined physisorption and chemisorption properties which are additionally increased beyond the sum of the individual measures, which has to be taken as an indication of the presence of a synergistic effect.

As the studies carried out by the applicants surprisingly show, the use of metal compounds or metal salts in ionic liquids (IL) is significantly more efficient compared to the conventional use of metal salts in crystalline form or in the form of solids because, without wishing to be tied to this theory, blockage of pore systems in the activated carbon is efficiently countered because the catalytic or reactive system is used in the form of a liquid. In addition, the use of ionic liquid (IL) as, so to speak, solvent or liquid carrier medium for the metals or metal compounds used leads, due to the presence of optimized diffusion processes, to good distribution of the substances to be sorbed in the activated carbon system, which likewise improves the sorption thereof.

According to the invention, the metal components based on the ionic liquid (IL) with the metal or the metal compound which are responsible for the reactive or catalytic modification and the particulate activated carbon modified or impregnated therewith thus supplement one another in a particular way.

In the context of the present invention, an optimized adsorption system having combined and complementary properties of physisorption and chemisorption is made available as a result.

In the context of the present invention, it is completely surprising that activated carbon as such can be provided at all in an effective way with a metal component using an ionic liquid (IL), since activated carbon as such fundamentally has hydrophobic properties, which fundamentally stands in the way of efficient wetting or impregnation. However, owing to the specific mode of operation according to the invention, we have succeeded, in a completely surprising and unforeseeable way, to provide the activated carbon as such (even without pretreatment) with the metal component in question using an ionic liquid (IL), which leads to the abovementioned positive properties in respect of the sorption of harmful substances. In this regard, the fact that activated carbon as such, in contrast to conventional support materials, has at most only a small number of polar or functional groups or has essentially no polar or functional groups which could interact with the metal component or the metal and/or the ionic liquid (IL) in an undesirable way is advantageous. In contrast to activated carbon as is used according to the invention, conventional support materials such as aluminum oxide, silicon dioxide or other mineral oxides often have acidic or basic groups which can reduce the activity of the component used, which is not the case for activated carbon.

In summary, the activated carbon which has been modified according to the invention thus displays excellent adsorption properties based on a combination of physisorption and chemisorption, with the tendency for desorption of sorbed substances at the same time being significantly reduced, in contrast to conventional activated carbon. In particular, a liberation or resorption of previously sorbed substances which frequently occurs in the case of conventional activated carbon, e.g. on exhaustion or excessive loading, does not occur or does not occur to an appreciable extent in the case of the activated carbon of the invention. Owing to the inventive concept of provision of an activated carbon which has not only its inherent adsorptive properties but also reactive or catalytic properties, lasting and generally reversible binding or efficient degradation of sorbed substances is ensured, which leads both to reduced desorption of the substances in question and to an increase in the total adsorption capacity.

In general, the activated carbon of the invention is, for example, suitable for gas adsorption and in particular for adsorption of sulfur-containing gases (e.g. sulfur oxides and/or hydrogen sulfite), of nitrogen-containing gases (e.g. nitrogen oxides and/or nitrogen hydrides such as ammonia) and also of halogen-containing gases (e.g. hydrogen chloride). The activated carbon of the invention is equally well suited to the adsorption of halogens as such, in particular in the form of gases or vapors, for example iodine vapors or the like. For this reason, too, the activated carbon of the invention is also suitable for, for example, the purification or provision of purified air for clean rooms or the like. In particular, the activated carbon of the invention has particularly good properties in respect of the sorption, in particular physisorption and/or chemisorption, of sulfur oxides and nitrogen oxides, hydrogen halides, cyanogen gas, hydrogen cyanide, hydrogen sulfide and/or ammonia and also chlorine gas.

A further advantage of the activated carbon of the invention is that the sorption properties are at least essentially independent of the atmospheric humidity, in particular in respect of the atmospheric humidities which normally occur under use conditions.

In addition, the activated carbon of the invention has excellent sorption properties both in the case of low concentrations and high concentrations of (harmful) substances or gases to be sorbed in media to be purified, e.g. air, which makes the activated carbon of the invention interesting for, for example, the treatment of air for clean room conditions.

As regards the ionic liquid (IL) used for the purposes of the present invention, this is composed of salts which melt at low temperatures, i.e. in particular salts which are present in liquid form even at room temperature (T=20° C.). In particular, the ionic liquid (IL) used according to the invention has nonmolecular, ionic character, i.e. the ionic liquid (IL) is present in ionic or dissociated form. In general, the ionic liquid (IL) as used according to the invention has a melting point in the range from 250° C. to −90° C., in particular in the range from 200° C. to −100° C., preferably in the range from 100° C. to −90° C. (at atmospheric pressure, i.e. 1013 bar).

The ionic liquid (IL) is generally made up of positive ions (cations) and negative ions (anions), with the ionic liquid (IL) being uncharged overall. In general, both the anions and the cations of an ionic liquid (IL) can, independently of one another, be organic or inorganic in nature, so that the ionic liquid (IL) is generally an organic or inorganic salt which melts at low temperatures. The cations and anions of an ionic liquid (IL) are preferably monovalent, but higher valences can be present, or different valences while maintaining the overall charge neutrality, so that the number of anions is not necessarily the same as the number of cations. Combinations of both different anions and different cations can equally well be present in ionic liquids (IL).

Appropriate selection of the cations and anions present make it possible, in particular, to set the polarity in a targeted way and thus adapt or set the solubility properties of the respective ionic liquid (IL). Here, it is possible to use or set both water-miscible ionic liquids and water-immiscible ionic liquids. The use of ionic liquids (IL) which form two phases even with organic solvents is in principle also possible, but is not preferred according to the invention. According to the invention, the ionic liquid (IL) used is preferably a compound which is miscible with or soluble in, in particular, polar organic liquids or solvents.

In contrast to conventional molecular liquids, ionic liquids (IL) are completely ionic or ionic in their totality. Owing to the abovementioned properties, ionic liquids (IL) are thus present as melts and/or in dissociated form on the basis of the parent cations and anions even at low temperatures, e.g. at room temperature (T=20° C.), and atmospheric pressure.

In this context, ionic liquids (IL) have particular physicochemical properties, e.g. electrical conductivity and specific dissolution and mixing properties. Ionic liquids (IL) generally have an extremely low vapor pressure and therefore no tendency or at most a negligibly small tendency to vaporize. This is also a great advantage from a process engineering point of view since this allows, for example, separation of a reaction mixture by distillation as an effective method of separating off the product, with the problems associated with azeotrope formation between solvents and products, as are known from the prior art, not occurring. In particular, ionic liquids (IL) display, below their decomposition temperature which is often above 200° C., at least essentially no macroscopic losses due to vaporization or the like even under high-vacuum conditions. In addition, ionic liquids (IL) as are used according to the invention are generally not combustible.

The wide variety in the structure of their cations and/or anions makes it possible to vary or set the physicochemical properties of ionic liquids (IL) over a wide range, so that, in the context of the present invention, it is possible to use ionic liquids (IL) which have so to speak been tailored or optimized for the respective application in order to allow particularly effective modification of the activated carbon of the invention with the metal component. Thus, for example, it is possible to set or predetermine the polarity, the viscosity, the melting behavior, in particular the melting point, or the like in a targeted manner.

Stated more precisely, an ionic liquid (IL) is a liquid which contains exclusively ions. Thus, an ionic liquid (IL) is composed of liquid salts in the form of melts, without the parent salt being dissolved in a solvent such as water. As indicated above, an ionic liquid (IL) is thus a salt which is liquid or present in the molten state at temperatures below 250° C., in particular below 200° C., preferably below 100° C., at atmospheric pressure. In summary, it can be said that ionic liquids (IL) display a series of interesting properties. As indicated above, ionic liquids (IL) are thermally stable, nonflammable and have a very low and effectively unmeasurable vapor pressure. In addition, ionic liquids (IL) have very good solvent properties for numerous substances. Owing to their purely ionic structure, ionic liquids (IL) have particular electrochemical properties, e.g. electrical conductivity and also a high electrochemical stability and thus a high stability toward oxidation or reduction. In particular, variation of cation and anion, especially with regard to the use of specific organic moieties for cation or anion, in particular for the cation, or for chains or substituents, enable, for example, the solubility in water or in organic solvents to be varied, which likewise applies to the melting point and the viscosity.

For further information on ionic liquids (IL), reference may be made to the scientific publication by Wasserscheid P., Keim W., *Angew. Chem.*, 2000, 112, 3926-3945.

In general, the ionic liquid (IL) used according to the invention is a compound of the general formula $[Cat]^{n+}[An]^{n-}$, where "Cat" is a cation and "An" is an anion and "n" is an integer of 1 or 2, in particular 1. According to the invention, the ionic liquid (IL) thus preferably has monovalent cations and anions.

It is also possible in the context of the present invention for the ionic liquid (IL) to be a compound of the general formula $[Cat_1]_x^{y+}[An_1]_y^{x-}$, where "$Cat_1$" is a cation and "$An_1$" is an anion and "x" and "y" are each, independently of one another, an integer in the range from 1 to 4, in particular in the range from 1 to 3, preferably 1 or 2, preferably in each case 1.

Furthermore, the cation $[Cat]^{n+}$ of the ionic liquid (IL) can be a nitrogen-containing cation. In this context, it is possible according to the invention for the nitrogen-containing cation to be selected from the group consisting of quaternary ammonium cations, imidazolium cations, pyridinium cations, pyrazolium cations and triazinium cations, in particular imidazolium cations. The heteroaromatics named are not restricted only to the abovementioned parent molecules or the ring as such but also encompass substituted derivatives of the parent molecules or rings in question, with the substituents mentioned below, in particular, also coming into consideration here.

In the context of the present invention, the cation $[Cat]^{n+}$ of the ionic liquid (IL) can be a phosphorus-containing cation, in particular a phosphonium cation.

According to the invention, it has been found to be particularly advantageous for the cation $[Cat]^{n+}$ of the ionic liquid (IL) to be selected from the group consisting of quaternary ammonium cations of the general formula (I):

$$[NR^1R^2R^3R]^+ \quad \text{formula (I)}$$

phosphonium cations of the general formula (II):

$$[PR^1R^2R^3R]^+ \quad \text{formula (II)}$$

imidazolium cations of the general formula (III):

formula (III)

where, in the formula (III), the imidazole ring is optionally substituted by at least one group selected from among $(C_1-C_8)$-alkyl groups, $(C_1-C_8)$-alkoxy groups, $(C_1-C_8)$-aminoalkyl groups, $(C_5-C_{12})$-aryl groups and $(C_5-C_{12})$-aryl-$(C_1-C_8)$-alkyl groups;

pyridinium cations of the general formula (IV):

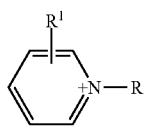

formula (IV)

where, in the formula (IV), the pyridine ring is optionally substituted by at least one group selected from among $(C_1-C_6)$-alkyl groups, $(C_1-C_6)$-alkoxy groups, $(C_1-C_6)$-aminoalkyl groups, $(C_5-C_{12})$-aryl groups and $(C_5-C_{12})$-aryl-$(C_1-C_6)$-alkyl groups;

pyrazolium cations of the general formula (V):

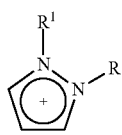

formula (V)

where, in the formula (V), the pyrazole ring is optionally substituted by at least one group selected from among $(C_1-C_6)$-alkyl groups, $(C_1-C_6)$-alkoxy groups, $(C_1-C_6)$-aminoalkyl groups, $(C_5-C_{12})$-aryl groups and $(C_5-C_{12})$-aryl-$(C_1-C_6)$-alkyl groups; and triazinium cations of the general formula (VI):

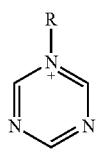

formula (VI)

where, in the formula (VI), the triazine ring is optionally substituted by at least one group selected from among $(C_1-C_6)$-alkyl groups, $(C_1-C_6)$-alkoxy groups, $(C_1-C_6)$-aminoalkyl groups, $(C_5-C_{12})$-aryl groups and $(C_5-C_{12})$-aryl-$(C_1-C_6)$-alkyl groups;

where, in the formulae (I) to (VI), independently of one another, the radicals $R^1$, $R^2$, $R^3$ are selected independently from the group consisting of hydrogen;

linear or branched, saturated or unsaturated, aliphatic or alicyclic $(C_1-C_{20})$-alkyl groups;

heteroaryl groups or $(C_3-C_8)$-heteroaryl-$(C_1-C_6)$-alkyl groups, in particular those having at least one heteroatom, in particular selected from the group consisting of N, O and S, where the heteroaryl radical is, in particular, optionally substituted by at least one group, in particular at least one $(C_1-C_6)$-alkyl group, and/or at least one halogen atom; and aryl groups or $(C_5-C_{12})$-aryl-$(C_1-C_6)$-alkyl groups, in particular where the abovementioned groups are in each case optionally substituted by at least one $(C_1-C_6)$-alkyl group and/or at least one halogen atom; and in the formulae (I) to (VI), independently of one another, the radical R is selected from among linear or branched, saturated or unsaturated, aliphatic or alicyclic $(C_1-C_{20})$-alkyl groups;

$(C_3-C_8)$-heteroaryl-$(C_1-C_6)$-alkyl groups, in particular having at least one heteroatom, in particular selected from the group consisting of N, O and S, where, in particular, the heteroaryl radical is optionally substituted by at least one group, in particular at least one $(C_1-C_6)$-alkyl group, and/or at least one halogen atom; and $(C_5-C_{12})$-aryl-$(C_1-C_6)$-alkyl groups, where, in particular, the abovementioned groups are optionally substituted by at least one $(C_1-C_6)$-alkyl group and/or a halogen atom.

In a preferred embodiment of the invention, the cation $[Cat]^{n+}$ of the ionic liquid (IL) is an imidazolium cation of the general formula (III):

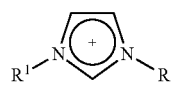

formula (III)

where, in the formula (III), the imidazole ring is optionally substituted by at least one group selected from among $(C_1-C_8)$-alkyl groups, $(C_1-C_8)$-alkoxy groups, $(C_1-C_8)$-aminoalkyl groups, $(C_5-C_{12})$-aryl groups and $(C_5-C_{12})$-aryl-$(C_1-C_8)$-alkyl groups and, in the formula (III), the radicals R and $R^1$ are selected independently from the group consisting of linear or branched, saturated or unsaturated, aliphatic or alicyclic, in particular linear $(C_1-C_{20})$-alkyl groups, in particular where the radicals R and $R^1$ are different and/or in particular where the radicals R and $R^1$ have a different number of carbon atoms, and/or, in the formula (III), the radical R is a methyl group and, in the formula (III), the radical $R^1$ is an in particular linear $(C_1-C_{20})$-alkyl group, preferably an in particular linear $(C_2-C_{12})$-alkyl group, preferably an in particular linear $(C_2-C_8)$-alkyl group, and/or, in the formula (III), the radical R is a methyl group and, in the formula (III), the radical $R^1$ is an ethyl group, butyl group or octyl group, in particular an ethyl group.

Furthermore, particularly good results are obtained in the context of the present invention when the cation $[Cat]^{n+}$ of the ionic liquid (IL) is a 1-ethyl-3-methylimidazolium cation ($[EMIM]^+$), a 1-butyl-3-methylimidazolium cation ($[BMIM]^+$) or a 1-octyl-3-methylimidazolium cation ($[OMIM]^+$), in particular a 1-ethyl-3-methylimidazolium cation ($[EMIM]^+$).

As regards the anion $[An]^{n-}$ of the ionic liquid (IL) used according to the invention, the anion $[An]^{n-}$ of the ionic liquid (IL) can according to the invention be an organic or inorganic anion.

In this context, the anion $[An]^{n-}$ of the ionic liquid (IL) can be selected from the group consisting of chlorocuprate ($[CuCl_3]^-$), bromocuprate ($[CuBr_3]^-$), chlorostannate ([SnCl$_3$]$^-$, [Sn$_2$Cl$_5$])$^-$, bromostannate ([SnBr$_3$]$^-$), chlorozincate ([ZnCl$_3$]$^-$), bromozincate ([ZnBr$_3$]$^-$), chloroferrate ([FeCl$_3$]$^-$), bromoferrate ([FeBr$_3$]$^-$), chlorocobaltate ([CoCl$_3$]$^-$), bromocobaltate ([CoBr$_3$]$^-$), chloronickelate ([NiCl$_3$]$^-$), bromonickelate ([NiBr$_3$]$^-$), tetrafluoroborate ([BF$_4$]$^-$), tetrachloroborate ([BCl$_4$]$^-$), hexafluorophosphate ([PF$_6$]$^-$), hexafluoroantimonate ([SbF$_6$]$^-$), hexafluoroarsenate ([AsF$_6$]$^-$), sulfate ([SO$_4$]$^{2-}$), carbonate ([CO$_3$]$^{2-}$), fluorosulfonate [R'—COO]$^-$, [R'—SO$_3$]$^-$, [R'—SO$_4$]$^-$, [R'$_2$PO$_4$]$^-$, tetrakis(3,5-bis(trifluoromethyl)phenyl)borate ([BARF]$^-$) and bissulfonylamide [(R'—SO$_2$)$_2$N]$^-$, where R' is a linear or branched aliphatic or alicyclic alkyl radical containing from 1 to 12 carbon atoms or is a (C$_5$-C$_{18}$)-aryl radical, a (C$_5$-C$_{18}$)-aryl-(C$_1$-C$_6$)-alkyl radical or a (C$_1$-C$_6$)-alkyl-(C$_5$-C$_{18}$)-aryl radical, where the radical is optionally substituted by halogen atoms and/or oxygen atoms.

It is equally possible according to the invention for the anion [An]$^{n-}$ of the ionic liquid (IL) to be selected from the group consisting of dicyanamide ([N(CN)$_2$]$^-$), halides, in particular Cl$^-$, Br$^-$, F$^-$, I$^-$, nitrate ([NO$_3$]$^-$), nitrite ([NO$_2$]$^-$), anionic metal complexes, in particular [CuCl$_4$]$^{2-}$, [PdCl$_4$]$^{2-}$ or [AuCl$_4$]$^-$, acetate ([CH$_3$COO])$^-$, trifluroacetate ([F$_3$CCOO]$^-$), tosylate ([C$_7$H$_7$SO$_3$]$^-$), nonafluorobutanesulfonate ([C$_4$F$_9$SO$_3$]$^-$), tris(pentafluoroethyl)trifluorophosphate ([PF$_3$(C$_2$F$_5$)$_3$]$^-$), tricyanomethide ([C(CN)$_3$]$^-$), tetracyanoborate ([B(CN)$_4$]$^-$), thiocyanate ([SCN]$^-$), carboxylate ([R"—COO]$^-$), sulfonate ([R"—SO$_3$]$^-$), dialkylphosphate ([R"PO$_4$R'"]$^-$) and bissulfonylimides [(R"—SO$_2$)$_2$N]$^-$), where R" and R'" are each, independently of one another, a linear, branched, aliphatic or alicyclic (C$_5$-C$_{18}$)-alkyl radical or a (C$_5$-C$_{18}$)-aryl radical, (C$_5$-C$_{18}$)-aryl-(C$_1$-C$_6$)-alkyl radical or (C$_1$-C$_6$)-alkyl-(C$_5$-C$_{18}$)-aryl radical, in particular where the radical is optionally substituted by halogen atoms or oxygen atoms.

Particularly good results in respect of the sorptive properties of the activated carbon of the invention are also achieved when the anion [An]$^{n-}$ of the ionic liquid (IL) is a halide anion, in particular Cl$^-$, Br$^-$, F$^-$, I$^-$, preferably Cl$^-$, and/or when the anion [An]$^{n-}$ of the ionic liquid (IL) is a carboxylic acid anion, in particular an acetate anion.

According to the invention, the ionic liquid (IL) is preferably selected from the group consisting of compounds of the formulae (VII) to (IX)

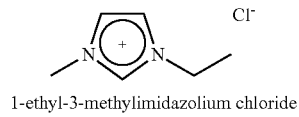

1-ethyl-3-methylimidazolium chloride

Formula (VII)

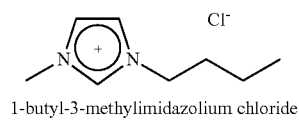

1-butyl-3-methylimidazolium chloride

Formula (VIII)

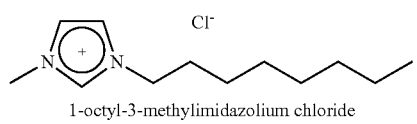

1-octyl-3-methylimidazolium chloride

Formula (IX)

In this context, it has been found to be particularly advantageous for the ionic liquid (IL) to be a compound of the formula (VII).

In this context, the applicants have, completely surprisingly, discovered that excellent results in respect of the provision of the activated carbon of the invention with catalytic or reactive properties are obtained using, in particular, an ionic liquid (IL) having a cation in the form of a 1-ethyl-3-methylimidazolium cation ([EMIM]$^+$), a 1-butyl-3-methylimidazolium cation ([BMIM]$^+$) and/or a 1-octyl-3-methylimidazolium cation ([OMIM]$^+$), in particular using a corresponding chloride anion, with increasingly good results being obtained in the order [OMIM]$^+$, [BMIM]$^+$ and [EMIM]$^+$, where [EMIM]$^+$ gives the best results, i.e. better results in respect of provision with the metal component are achieved with decreasing chain length of the substituent. Without wishing to be restricted to this theory, the abovementioned cations, in particular when using a corresponding chloride anion, have particularly good compatibility with the activated carbon to be modified, so that particularly effective impregnation of the pore system of the activated carbon is ensured. Here, the size, charge density and three-dimensional structure of the cations in question play a particular role. Even further improved results are achieved, as indicated above, when using [EMIM]$^+$, which, so to speak, has a further optimized pore accessibility. In addition, a relatively small cation size makes it possible to achieve larger proportions, in particular larger molar proportions, of the metal or the metal compound in the metal component or the metal-containing ionic liquid (IL), which improves the catalytic and reactive properties.

In general, it is also possible in the context of the present invention for the metal component to contain a mixture of different ionic liquids (IL).

It is also preferred according to the invention for the metal component to comprise at least one metal, in particular in the form of a metal compound, in at least one ionic liquid (IL), in particular in the ionic liquid (IL), in dissolved and/or dissociated form. In other words, preference is given according to the invention to the ionic liquid (IL) to represent the carrier medium or the solvent for the metal compound of the metal component. As indicated above, the metal compound is preferably at least essentially fully dissolved or dissociated in the ionic liquid (IL), so that the metal component overall represents, in particular, a liquid, in particular a solution or melt, which is free of crystals, crystallites and/or at least essentially free of particles.

According to the invention, the metal component and/or the ionic liquid (IL) can comprise at least one metal in a positive oxidation state, in particular at least one metal cation. In this context, the oxidation state of the metal can be in the range from +I to +VII, in particular in the range from +I to +IV, preferably in the range from +I to +III. The oxidation state of the metal is particularly preferably +I or +II. In the case of simple ions, the oxidation number corresponds to the number of charges, while in the case of multinuclear ions, in particular clusters, the oxidation number can deviate from the number of charges, which is, however, well known per se to those skilled in the art.

According to the invention, the metal component and/or the ionic liquid (IL) can comprise at least one metal selected from the group consisting of metals of the main and transition groups of the Periodic Table of the Elements and the lanthanides. The metal component and/or the ionic liquid (IL) can likewise comprise at least one metal of the main or transition groups of the Periodic Table of the Elements or at least one lanthanide. In particular, the metal component and/or the ionic liquid (IL) can comprise at least one metal selected from among elements of main group IV or of transition groups I, II, III, IV, V, VI, VII and VIII of the Periodic Table of the Elements, in particular from among elements of main group IV or of transition groups I and II of the Periodic Table of the Elements.

Preference is given according to the invention to the metal component and/or the ionic liquid (IL) comprising at least one metal selected from the group consisting of Cu, Ag, Au, Zn, Hg, Ln, Ce, Ti, Zr, V, Nb, Cr, Mo, W, Mn, Fe, Ru, Os, Co, Rh, Ir, Ni, Pd and Pt, in particular Zn, Ag, Sn, Ni and Cu.

In general, the metal component and/or the ionic liquid (IL) should comprise at least one metal compound, preferably on the basis of at least one above-defined metal, which is soluble or dissociatable in the ionic liquid (IL). The metal component and/or the ionic liquid should likewise comprise at least one inorganic or organic metal compound, preferably on the basis of at least one above-defined metal, in particular a metal salt or metal oxide, preferably a metal salt.

The term "soluble" or "dissociatable" as is used in this context for the purposes of the present invention should, in particular, be interpreted as meaning that, at the concentrations or amounts selected, the metal compound is at least essentially completely present in dissolved or dissociated form in the ionic liquid (IL) or metal component, so that at least essentially no solid particles or crystals and/or crystallites of the metal compound are present in the metal component.

For the purposes of the present invention, the metal component and/or the ionic liquid (IL) can in particular comprise an organic or inorganic metal salt, preferably on the basis of at least one above-defined metal. Here, the metal salt can be selected from the group consisting of halide salts, sulfates, sulfides, sulfites, nitrates, nitrites, phosphates, phosphides, phosphites, carbamates, alkoxides and carboxylic acid salts, in particular halide salts and carboxylic acid salts.

In particular, the metal component and/or the ionic liquid (IL) can comprise a metal halide, preferably on the basis of at least one above-defined metal, in particular a fluoride, chloride, bromide or iodide, preferably chloride, or a carboxylic acid salt of a metal, in particular acetate.

In a particularly preferred embodiment of the invention, the metal component and/or the ionic liquid (IL) can comprise a metal compound selected from the group consisting of nickel chloride, copper chloride, zinc acetate and tin acetate. For example, the use of copper compounds or copper salts, in particular in the form of copper chloride, has been found to be advantageous, for example for the sorption of nitrogen-containing gases, in particular ammonia ($NH_3$), with ammonia being, without wishing to be restricted to this theory, sorbed in particular in the form of irreversible gas binding. This forms, by means of chemisorption, in particular a copper tetraammine complex ($[Cu(NH_3)_4]^{2+}$), with part of the sorbed ammonia also being bound by means of physisorption. This also results in only slight desorption of the sorbed compounds.

In particular, the ionic liquid (IL) is present together with the metal and/or the metal compound as a melt. As indicated above, the metal and/or the metal compound should likewise be present in at least essentially crystal- and/or crystallite-free form in the ionic liquid (IL). The metal and/or the metal compound should likewise be present at least in essentially completely dissolved, in particular at least essentially completely dissociated, form in the ionic liquid (IL).

As regards the amount of metal in the ionic liquid (IL), this can vary within a wide range. However, preference is given according to the invention to the ionic liquid (IL) containing the metal, in particular the metal compound, in amounts of from 0.001% by weight to 80% by weight, in particular from 0.01% by weight to 60% by weight, preferably from 0.1% by weight to 50% by weight, based on the ionic liquid (IL) and calculated as metal.

In addition, particularly good results are obtained when the metal component or the metal-containing ionic liquid (IL) contains the metal, in particular in the form of the metal compound, in a molar proportion in the range from 1% to 90%, in particular in the range from 5% to 70%, preferably in the range from 10% to 60%, more preferably in the range from 10% to 55%, based on the metal component or the metal-containing ionic liquid (IL) and calculated as metal.

The ratio of ionic liquid (IL) to the metal used is also of importance to the catalytic or reactive properties. Thus, particularly good results are achieved according to the invention when the molar ratio of ionic liquid (IL) to metal "[ionic liquid (IL): metal]" is in the range from [10:0.1] to [0.1:10], in particular in the range from [1:0.5] to [1:3], preferably in the range from [1:0.6] to [1:2], more preferably in the range from [1:1] to [1:1.6].

As regards the abovementioned values for the amount and the molar proportion of the metal or the metal compound or the molar ratio of ionic liquid (IL) to metal, the corresponding upper limits should also be selected or set according to the solubility behavior of the metal or the metal compound, in particular so that at least essentially no solids or crystals or crystallites of the metal or the metal compound are present in the resulting solution or melt. This is a matter of routine for a person skilled in the art.

To optimize the wetting or impregnation of the activated carbon with the metal component further, it is possible, according to the invention, for the mixture, in particular the solution and/or melt, of the ionic liquid (IL) and the metal, in particular the metal compound, to have a density of from 1 $g/cm^3$ to 2.5 $g/cm^3$ at a temperature of $T=20°$ C. and atmospheric pressure, in particular from 1.2 $g/cm^3$ to 2 $g/cm^3$, preferably from 1.3 $g/cm^3$ to 1.9 $g/cm^3$. The density can, in particular, be determined by means of a helium pycnometer at a temperature of $T=20°$ C. and atmospheric pressure.

For the purposes of the present invention, the activated carbon is, in particular, at least partly brought into contact and/or wetted and/or covered, in particular impregnated, with the metal-containing ionic liquid (IL). It is likewise possible, according to the invention, for the surface of the activated carbon and/or the pore system of the activated carbon, in particular the micropores, mesopores and/or macropores, preferably the surface of the activated carbon and the pore system of the activated carbon, to be at least partly or to a defined degree of coverage or filling brought into contact and/or wetted and/or covered, in particular impregnated, with the metal-containing ionic liquid (IL). The provision of the activated carbon with the metal component makes a particularly good catalytic activity or reactivity of the activated carbon according to the invention possible, both in respect of the external structures and in respect of the internal structures.

In this context, it has been found to be advantageous for the purposes of the present invention for the activated carbon to comprise the metal-containing ionic liquid (IL) in amounts of from 1% by volume to 70% by volume, in particular from 2% by volume to 60% by volume, preferably from 3% by volume to 50% by volume, and more preferably from 5% by volume to 40% by volume, based on the volume of the activated carbon. The activated carbon can, according to the invention, likewise comprise the metal-containing ionic liquid (IL) in amounts of from 1% by volume, in particular at least 2% by volume, preferably at least 3% by volume, more preferably at least 5% by volume, based on the volume of the activated carbon. Apart from the abovementioned lower limit, the upper limit to the amounts of ionic liquid (IL) to be used is also of great importance. According to the invention, the activated carbon can comprise the metal-containing ionic liquid (IL) in amounts of not more than 70% by volume, in particular not more than 60% by volume, preferably not more than 50% by volume, more preferably not more than 40% by volume, based on the volume of the activated carbon.

As regards the sorptive properties, in particular on the basis of the combination of physisorption and chemisorption, the degree of fill $\alpha$ of the pores of the activated carbon with the metal-containing ionic liquid (IL) is also of great importance. Thus, it is preferred according to the invention for the activated carbon to have a degree of fill $\alpha$ of the pores with the metal-containing ionic liquid (IL) of from 0.01 to 0.99, in particular from 0.05 to 0.8, preferably from 0.1 to 0.6, more preferably from 0.15 to 0.5. In this context, the activated carbon should have a degree of fill $\alpha$ of the pores with the metal-containing ionic liquid (IL) of not more than 0.99, in particular not more than 0.8, preferably not more than 0.6, more preferably not more than 0.5. The activated carbon of the invention should likewise have a degree of fill $\alpha$ of the pores with the metal-containing ionic liquid (IL) of at least 0.01, in particular at least 0.05, preferably at least 0.1, more preferably at least 0.15.

The degree of fill $\alpha$ of the pores is calculated according to the formula $[\alpha=V_{IL}/(V_{pore} \cdot m_{support})]$. In the abovementioned formula, "$V_{IL}$" is the volume of the ionic liquid (IL) to be used, "$m_{support}$" is the mass of the activated carbon to be used and "$V_{pore}$" is the specific (mass-based) pore volume of the activated carbon. In other words, the degree of fill $\alpha$ of the pores is a measure of the contacting or wetting or coverage, in particular impregnation, of the activated carbon with the metal component based on the ionic liquid (IL) containing metal or metal ions, with the values reported being relative to the total pore volume. A degree of fill $\alpha$ of the pores of 0.2 thus means that 20% of the pore volume is filled with the metal component, with, in particular, in this respect wetting of the wall of the respective pores with a corresponding layer of the metal component with the ionic liquid (IL) and the metal or metal ions being able to occur, without being restricted to this interpretation. In general, the layer thickness of the metal component is in the region of a few nm. The targeted setting of the degree of fill $\alpha$ of the pores ensures that a particular part of the pore system is free, i.e. not provided with the metal component, and thus has, in particular, physisorptive properties.

In particular, for the purposes of the present invention, the degree of fill $\alpha$ of the pores should be such that and/or the amount of metal-containing ionic liquid (IL) should be designed so that from 20% to 95%, in particular from 30% to 90%, preferably from 40% to 80%, of the (internal) pore volume of the activated carbon is not filled with the metal-containing ionic liquid (IL). In other words, from 20% to 95%, in particular from 30% to 90%, preferably from 40% to 80%, of the (internal) pore volume of the activated carbon should be freely accessible for sorptive, in particular physisorptive, processes after provision of the activated carbon with the metal-containing ionic liquid (IL). This ensures that the activated carbon is not only provided with the metal-containing ionic liquid (IL) but also as such has a sufficient sorption capacity, in particular on the basis of physisorption.

On the basis of the concept according to the invention with the specific provision of a support system with a reactive or catalytically active component in the form of a liquid, the activated carbon of the invention can also be configured as or be termed an SILP system (Supported Ionic Liquid Phase).

As regards the activated carbon to be used for the purposes of the present invention for provision with the metal component, it is here possible to use many different activated carbons, for example having a different pore structure in respect of the distribution of micropores, mesopores and macropores. In particular, it is possible to use commercially available or commercially traded activated carbons. Activated carbons used for the purposes of the present invention are marketed, for example, by Blücher GmbH, Erkrath, Germany or by AdsorTech GmbH, Premnitz, Germany.

Furthermore, a granular, in particular spherical, activated carbon can be employed as activated carbon used according to the invention.

The activated carbon used, in particular carbon granules or carbon beads, can be obtained by known processes of the prior art: granular or spherical sulfonated organic polymers, in particular on the basis of divinylbenzene-crosslinked polystyrene, are for this purpose customarily carbonized and subsequently activated to give the respective activated carbon. For further details on this subject, reference may be made, for example, to the documents DE 43 28 219 A1, DE 43 04 026 A1, DE 196 00 237 A1, and EP 1 918 022 A1 or the parallel U.S. Pat. No. 7,737,038 B2 belonging to the same patent family. It is likewise possible to use activated carbon based on other starting materials such as pitch or the like. This is known per se to those skilled in the art.

The parameter data indicated below in respect of the activated carbon used are determined by means of standardized or explicitly indicated methods of determination or by methods of determination which are known per se to those skilled in the art. In particular the parameter data concerning the characterization of the porosity, the pore size distribution and other adsorption properties are each generally derived from the nitrogen sorption isotherms concerned of the relevant activated carbon or the products measured.

In particular, for the purposes of the present invention, use is made of an activated carbon which has particle sizes, in particular particle diameters, in the range from 0.001 to 2 mm, in particular from 0.01 to 1 mm, preferably from 0.05 to 0.8 mm, more preferably from 0.1 to 0.7 mm, particularly preferably from 0.15 to 0.6 mm. Here, at least 80% by weight, in particular at least 90% by weight, preferably at least 95% by weight, based on the activated carbon, of the activated carbon used should have particle sizes, in particular particle diameters, in the abovementioned ranges.

Furthermore, it is advantageous for the purposes of the invention for the activated carbon to have average particle sizes (D50), in particular average particle diameters (D50), in the range from 0.01 to 1 mm, in particular from 0.05 to 0.8 mm, preferably from 0.1 to 0.6 mm, more preferably from 0.15 to 0.5 mm, particularly preferably from 0.2 to 0.4 mm.

The corresponding particle sizes or diameters can, for example, be determined on the basis of the method described in ASTM D2862-97/04. In addition, the abovementioned sizes can be determined using determination methods based on sieve analysis, based on X-ray diffraction, laser light scattering or the like. The respective methods of determination are in themselves well known to a person skilled in the art, so that nothing more has to be said in this respect.

In particular, the activated carbon according to the invention should have a total pore volume, in particular a total pore volume determined by the Gurvich method, in the range from 0.4 to 4 cm$^3$/g, in particular from 0.5 to 3.5 cm$^3$/g, preferably from 0.6 to 3 cm$^3$/g, particularly preferably from 0.7 to 2.5 cm$^3$/g. In this context, it is advantageous for the purposes of the invention for from 50% to 99%, in particular from 60% to 99%, preferably from 70% to 95%, of the total pore volume, in particular the total pore volume determined by the Gurvich method, of the activated carbon to be formed by pores having pore diameters of ≤50 nm, in particular by micropores and/or mesopores, and/or for from 20% to 85%, in particular from 30% to 80%, preferably from 40% to 75%, of the total pore volume, in particular of the total pore volume determined by the Gurvich method, of the activated carbon to be formed by pores having pore diameters in the range from 2 nm to 50 nm, in particular by mesopores.

According to the invention, use of activated carbon having a high microporosity and mesoporosity, in particular a high mesoporosity, gives particularly good results for the sorption of gases to be sorbed, in particular hydrogen sulfide and ammonia.

As regards the determination of the total pore volume by the Gurvich method, this is a measurement/determination method known per se to a person skilled in this field. For further details regarding the determination of the total pore volume by the Gurvich method, reference may be made, for example, to L. Gurvich (1915), J. Phys. Chem. Soc. Russ. 47, 805, and also to S. Lowell et al., Characterization of Porous Solids and Powders: Surface Area Pore Size and Density, Kluwer Academic Publishers, Article Technology Series, pages 111 ff.

For the purposes of the present invention, it is possible, in particular, for the activated carbon to have a pore volume formed by pores having pore diameters of ≤2 nm, in particular micropore volume determined by the carbon black method, in the range from 0.1 to 2 $cm^3/g$, in particular from 0.2 to 1.5 $cm^3/g$, preferably from 0.3 to 1.1 $cm^3/g$, particularly preferably from 0.4 to 1 $cm^3/g$, or for from 20% to 95%, in particular from 30% to 95%, preferably from 40% to 90%, of the total pore volume of the activated carbon to be formed by pores having pore diameters of ≤2 nm, in particular by micropores.

The carbon black determination method is known per se to a person skilled in the art, and further details are therefore unnecessary in this respect. In addition, further details regarding the determination of the pore surface area and the pore volume by the carbon black method may be found, for example, in R. W. Magee, Evaluation of the External Surface Area of Carbon Black by Nitrogen Adsorption, Presented at the Meeting of the Rubber Division of the American Chem. Soc., October 1994, e.g. referred to in: Quantachrome Instruments, AUTOSORB-1, AS1 WinVersion 1.50, Operating Manual, OM, 05061, Quantachrome Instruments 2004, Fla., USA, pages 71 ff.

For the purposes of the present invention, it is likewise advantageous for the activated carbon to have an average pore diameter in the range from 1 to 60 nm, in particular from 1 to 55 nm, preferably from 1.5 to 50 nm, particularly preferably from 2 to 45 nm. The determination of the average pore diameter is carried out on the basis of the respective nitrogen sorption isotherms.

To maintain the sorption properties of the activated carbon of the invention, the activated carbon used should have a sufficiently large BET surface area. In particular, the activated carbon should have a specific BET surface area in the range from 500 $m^2/g$ to 3500 $m^2/g$, in particular from 600 to 3000 $m^2/g$, preferably from 700 to 2750 $m^2/g$, particularly preferably from 800 to 2500 $m^2/g$.

The determination of the specific BET surface area is in principle known per se to those skilled in the art, so that further details do not have to be given in this respect. All BET surface areas indicated are based on the determination in accordance with ASTM D6556-04. For the purposes of the present invention, the BET surface area is determined, in general and unless explicitly indicated otherwise, using the multipoint BET determination method (MP-BET) in a partial pressure range $p/p_0$ from 0.05 to 0.1.

As regards further details relating to the determination of the BET surface area or relating to the BET method, reference may be made to the abovementioned ASTM D6556-04 and to Römpp Chemielexikon, $10^{th}$ edition, Georg Thieme Verlag, Stuttgart/New York, keyword: "BET-Methode" including the literature referred to there, and to Winnacker-Küchler ($3^{rd}$ edition), volume 7, pages 93 ff., and also to Z. Anal. Chem. 238, pages 187 to 193 (1968).

Furthermore, it is advantageous for the activated carbon to have a surface area formed by micropores of from 400 to 2500 $m^2/g$, in particular from 500 to 2300 $m^2/g$, preferably from 600 to 2100 $m^2/g$, particularly preferably from 700 to 1900 $m^2/g$.

The activated carbon used according to the invention should additionally have a density of from 1.1 to 3.5 g/ml, in particular from 1.5 to 3 g/ml, preferably from 1.75 to 2.75 g/ml, more preferably from 2 to 2.5 g/ml.

The activated carbon should likewise have a bulk density of from 0.1 to 1.5 g/ml, in particular from 0.15 to 1 g/ml, preferably from 0.2 to 0.8 g/ml, more preferably from 0.3 to 0.6 g/ml.

In addition, it is advantageous for the activated carbon to have a sufficient mechanical strength. In particular, the activated carbon has a compressive strength and/or rupture strength (weight loadability) per activated carbon grain, in particular per activated carbon bead, of at least 10 newton, in particular at least 15 newton, preferably at least 20 newton. In addition, it is advantageous for the activated carbon to have a compressive strength and/or rupture strength (weight loadability) per activated carbon grain, in particular per activated carbon bead, in the range from 10 to 50 newton, in particular from 12 to 45 newton, preferably from 15 to 40 newton.

It is likewise possible for the purposes of the present invention for the activated carbon to be modified on its surface. In this context, the activated carbon can be modified with hydrophilic groups on its surface. In this way, impregnation with the metal components can be improved further.

Furthermore, the activated carbon according to the invention can be self-supporting and/or be in the form of an in particular loose bed.

However, as an alternative, it is also possible for the activated carbon to have been applied to a support material.

In this context, the support material can be gas-permeable, in particular air-permeable.

As regards the support material as such in this context, the support material should have a gas permeability, in particular air permeability, of at least 10 $l·m^{-2}·s^{-1}$, in particular at least 30 $l·m^{-2}·s^{-1}$, preferably at least 50 $l·m^{-2}·s^{-1}$, particularly preferably at least 100 $l·m^{-2}·s^{-1}$, very particularly preferably at least 500 $l·m^{-2}·s^{-1}$, and/or a gas permeability, in particular air permeability, of up to 10 000 $l·m^{-2}·s^{-1}$, in particular up to 20 000 $l·m^{-2}·s^{-1}$, at a flow resistance of 127 Pa.

In an embodiment of the present invention, the support material used according to the invention can have a three-dimensional structure. In particular, the support material used according to the invention can, in this embodiment, be configured as a preferably open-pored foam, particularly preferably polyurethane foam.

In an alternative embodiment, on the other hand, the support material used according to the invention can have a two-dimensional and/or sheet-like structure. In particular, the support material used according to the invention in this embodiment can be configured as a preferably textile sheet. For example, the support material can be configured as a textile sheet, preferably an air-permeable textile material, preferably a woven fabric, drawn-loop knit, formed-loop knit, lay-up or textile composite, in particular nonwoven.

The support material can likewise have a weight per unit area of from 5 to 1000 g/m², in particular from 10 to 500 g/m², preferably from 25 to 450 g/m². In addition, the support material can in this embodiment be a textile sheet containing or consisting of natural fibers and/or synthetic fibers (chemical fibers). In this context, the natural fibers can be selected from the group consisting of wool fibers and cotton fibers (CO). In addition, the synthetic fibers can be selected from the group consisting of polyesters (PES); polyolefins, in particular polyethylene (PE) and/or polypropylene (PP); polyvinyl chlorides (CLF); polyvinylidene chlorides (CLF); acetates (CA); triacetates (CTA); polyacrylic (PAN); polyamides (PA), in particular aromatic, preferably flame-resistant polyamides; polyvinyl alcohols (PVAL); polyurethanes; polyvinyl esters; (meth)acrylates; polylactic acids (PLA); activated carbon; and also mixtures thereof.

The activated carbon is, according to the invention, usually fixed to or on the support material. This can be achieved, for example, by means of adhesive bonding (e.g. by means of an adhesive) or as a result of intrinsic tack or intrinsic adhesion, in particular of the support material.

The activated carbon of the invention is associated with many advantages which have been indicated above. Owing to the excellent sorption properties of the activated carbon of the invention, a wide use or application range is possible, as is indicated in detail below.

The present invention also makes available, according to a second aspect of the present invention, the process of the invention for producing an activated carbon provided with at least one metal component, in particular for producing an activated carbon having reactive and/or catalytic activity, as defined above, wherein activated carbon, in particular many discrete activated carbon particles, preferably having a spherical and/or grain shape, is/are brought into contact, in particular wetted and/or coated and/or impregnated, with at least one metal component based on an optionally diluted metal-containing ionic liquid (IL), in particular an ionic liquid containing metal ions, preferably on the basis of a metal compound; in particular, any solvent used for dilution and/or any ionic liquid (IL) which has not been taken up by the activated carbon and/or excess metal-containing ionic liquid can subsequently be removed and/or separated off.

The present invention likewise makes available, according to this aspect of the invention, a process for producing an activated carbon provided with at least one metal component, in particular for producing an activated carbon having reactive and/or catalytic activity, as defined above, wherein the process comprises the following steps in the order (a) to (c) specified below:
(a) production and/or provision of at least one metal component based on a metal-containing ionic liquid (IL), in particular an ionic liquid containing metal ions, preferably based on a metal compound, in particular in the form of a solution and/or melt, wherein at least one metal, in particular in the form of metal ions, preferably based on a metal compound, is brought into contact with an ionic liquid (IL), in particular dissolved in an ionic liquid (IL);
(b) contacting, in particular wetting and/or coating and/or impregnating, of the activated carbon, in particular many discrete activated carbon particles, preferably having a spherical and/or grain shape, with the metal component based on the metal-containing ionic liquid (IL) obtained in step (a); and
(c) optionally removal and/or separating off of metal-containing ionic liquid (IL) which has not been taken up by the activated carbon and/or excess metal-containing ionic liquid, i.e. metal component which has not been taken up by the activated carbon and/or excess metal component.

Effective wetting or coating and/or impregnation of the activated carbon is achieved on the basis of the process of the invention. Contacting of the activated carbon with the metal component containing the ionic liquid (IL) ensures that the metal component comprising the ionic liquid (IL) not only wets the surface structures of the activated carbon but also penetrates into the internal pore system of the activated carbon and there leads to defined coating or wetting or impregnation of the surfaces of the porous structures, in particular micropores, mesopores and/or macropores. Owing to the specific physicochemical properties of the ionic liquid (IL), in particular in respect of the extremely low vapor pressure, the ionic liquid (IL) comprising the metal or the metal ions remains in the long term, i.e. in particular for the period of use of the activated carbon of the invention, in liquid form and in the activated carbon system, so that a lasting catalytically active or reactive liquid film is formed on the external and internal surfaces of the activated carbon, without having an adverse effect on the physisorptive properties of the activated carbon.

In the process of the invention, the ionic liquid (IL) in step (a) can contain the metal, in particular the metal compound, in amounts of from 0.001% by weight to 80% by weight, in particular from 0.01% by weight to 60% by weight, preferably from 0.1% by weight to 50% by weight, based on the ionic liquid (IL) and calculated as metal. In this context, it is advantageous according to the invention for the molar ratio of ionic liquid (IL) to metal "[ionic liquid (IL): metal]" in step (a) to be set in the range from [10:0.1] to [0.1:10], in particular in the range from [1:0.5] to [1:3], preferably from [1:0.6], to [1:2], more preferably from [1:1] to [1:1.6].

Furthermore, process step (a) can be carried out under an inert gas atmosphere and/or with introduction of shear forces, in particular with stirring or the like. In particular, process step (a) can be carried out at room temperature (T=20° C.).

In an embodiment of the invention, the metal-containing ionic liquid (IL), in particular the ionic liquid containing metal ions, can optionally be diluted with a diluent and/or solvent in step (a) and/or between step (a) and (b) and/or between step (b) and (c), preferably between step (a) and (b), optionally with subsequent removal and/or separating off of the diluent and/or solvent, in particular in step (c).

The optional dilution provided enables the viscosity of the ionic liquid (IL) to be set in a targeted manner in order to aid or increase penetration of the ionic liquid (IL) comprising the metal or the metal ions and thus the metal component into the pore structure of the activated carbon. Targeted selection of the diluent or solvent likewise enables the polarity of the ionic liquid (IL) or the resulting mixture with the solvent to be set in order to control or improve wetting of the surface of the activated carbon.

In this context, it is possible to use a polar and/or hydrophilic inorganic or organic, preferably organic, diluent and/or solvent. It is likewise possible to use a diluent and/or solvent having a boiling point (at atmospheric pressure) of not more than 250° C., in particular not more than 200° C., preferably not more than 150° C., preferably not more than 100° C. Furthermore, it can be provided according to the invention for a monohydric alcohol, in particular methanol, ethanol, butanol and/or propanol, preferably ethanol, to be used as diluent and/or solvent. However, it is also possible, as an alternative in carrying out the process of the invention, for the diluent and/or solvent to be selected from the group consisting of water, chlorinated hydrocarbons, in particular dichloromethane, aldehydes, ketones, in particular acetone, and mixtures thereof. It is likewise possible according to the invention to use mixtures of the solvents in question. This selection of the diluent or solvent and the setting of the mixing ratios are within the routine practice of a person skilled in the art, so that further details in this respect are unnecessary.

In addition, for the purposes of carrying out the process of the invention, the diluent and/or solvent can be used in amounts, based on 1 part by volume of ionic liquid (IL), of from 0.1 part by volume to 20 parts by volume, in particular from 0.2 part by volume to 15 parts by volume, preferably from 0.3 part by volume to 10 parts by volume, preferably from 0.5 part by volume to 10 parts by volume.

Furthermore, as regards step (b) of the process of the invention, a suspension of the activated carbon in the metal-containing ionic liquid (IL), in particular the ionic liquid containing metal ions, can be produced in this step. The contacting, in particular wetting and/or coating and/or impregnation, of the activated carbon can likewise be carried out in a suspension of the activated carbon in the ionic liquid (IL) in step (b).

In addition, wetting and/or coating and/or impregnation of both the external and the internal surface area, in particular the micropores, mesopores and/or macropores, of the activated carbon can occur according to the invention in step (b).

In the context of carrying out the process of the invention, it is likewise possible, in step (b), to select and/or set the volume of the ionic liquid to be used ($V_{IL}$) and/or the mass of the activated carbon to be used ($m_{support}$) and/or the specific (mass-based) pore volume of the activated carbon ($V_{pore}$) as a function of the degree of fill α of the pores which is to be set, in particular according to the formula [α=$V_{IL}$/$V_{pore}·m_{support}$)]. In this context, it is advantageous according to the invention for a degree of fill α of the pores in the range from 0.01 to 0.99, in particular from 0.05 to 0.8, preferably from 0.1 to 0.6, more preferably from 0.15 to 0.5, to result.

Furthermore, as regards step (b) of the process of the invention, it is advantageous according to the invention for step (b) to be carried out with introduction of energy. In this respect, it is particularly advantageous for the energy input to be effected by means of ultrasound or the like. The energy input, in particular by means of ultrasound, leads, in particular, to improved penetration of the metal component comprising the ionic liquid into the internal pore system of the activated carbon, with the degree of wetting or the pore fill volume a being able to be set or controlled via the intensity and duration of the energy input. Furthermore, it is advantageous according to the invention for the energy input, in particular the ultrasound input, to be pulsed, for example with a period of t=0.5 s.

Furthermore, as regards step (c) of the process of the invention, this can be carried out with heating, in particular to temperatures in the range from 25° C. to 90° C., in particular in the range from 30° C. to 75° C., preferably in the range from 35° C. to 65° C. Step (c) can likewise be carried out under reduced pressure, in particular in vacuo.

For example, step (c) can be carried out at a pressure P in the range from 50 to 300 mbar, in particular from 100 to 200 mbar. Step (c) can, for example, be carried out in a rotary evaporator or the like. Furthermore, final drying, in particular in a high vacuum, can be carried out in step (c) of the process of the invention, in particular for a time of from 5 to 20 hours, preferably at temperatures in the range from T=40° C. to 150° C., in particular from 45° C. to 100° C. Final drying can, for example, be carried out under high vacuum conditions in an oil bath.

The above-described process thus gives the activated carbon of the invention having the above-described advantages and properties.

The present invention therefore also makes available the activated carbon according to the invention which is obtainable by means of the above-described process.

As indicated above, the activated carbon of the invention has a wide range of uses.

The present invention further makes available, according to a third aspect of the present invention, the uses according to the invention of the activated carbon according to the invention.

Thus, the activated carbon of the invention can be used for producing protective materials of all types, in particular protective clothing, in particular for the civilian or military sector, e.g. protective suits, protective gloves, protective shoes, protective socks, protective headwear and the like, and for producing protective coverings of all types, preferably all abovementioned protective materials for ABC use.

Furthermore, the activated carbon of the invention is suitable for producing filters and filter materials of all types, in particular for the removal of harmful substances, odorous substances and poisons of all types, in particular from streams of air and/or gas, e.g. ABC protective mask filters, odor filters, wide-area filters, air filters, in particular filters for purifying the air of a room, adsorptive support structures and filters for the medical sector. Here, the activated carbon of the invention has excellent sorption properties, in particular in respect of sulfur-containing or nitrogen-containing gases, e.g. hydrogen sulfides, in particular hydrogen sulfide ($H_2S$), and also in respect of ammonia ($NH_3$). The activated carbon of the invention likewise displays excellent sorption properties, in particular in respect of halogen gases or vapors, e.g. chlorine gas and/or iodine vapors. The activated carbon of the invention also has excellent sorption properties in respect of hydrogen halides such as hydrogen chloride (HCl).

The activated carbon of the invention is also particularly suitable for use as sorption store for gases or liquids. In addition, the activated carbon of the invention can be employed as catalyst or catalyst support. In the abovementioned applications, the high specific surface area and the excellent reactivity or catalytic activity of the activated carbon of the invention is of critical importance.

Furthermore, the activated carbon of the invention is used for chemical catalysis, in particular for catalyzing chemical processes and reactions, in particular oligomerization and polymerization reactions, preferably of olefins such as ethylene, propylene, butylenes or the like, hydrogenation reactions, oxidation reactions, etc. Here too, the high porosity of the activated carbon of the invention in combination with the excellent reactive or catalytic properties plays a positive role. Furthermore, it is advantageous that the catalysis occurs on nonpolar oxygen-free supports, which represents an optimization of the catalysis process. In particular, the activated carbon of the invention can be used as catalyst or cocatalyst or as support for further catalysts.

A further possible application of the activated carbon of the invention is use in or as gas sensors or in fuel cells.

In addition, a further possible application of the activated carbon of the invention is use for sorptive, in particular adsorptive, applications, in particular as preferably reactive and/or catalytic adsorbent.

In addition, the activated carbon of the invention is suitable for use in gas purification and/or gas treatment.

A further use of the activated carbon of the invention is in the field of removal of harmful substances, in particular gaseous harmful substances, or of environmentally damaging, health-endangering or toxic substances or gases.

Finally, the activated carbon of the invention is also suitable for use in the treatment and/or provision of clean room atmospheres, in particular for the electrical industry, in particular for semiconductor or chip production. Here, the excellent properties of the activated carbon of the invention in respect of the sorption of halogen gases or vapors are also of critical importance. In particular, the activated carbon of the invention has a high sorption capability in respect of iodine vapors, which is of great importance for the application in question.

In addition, the present invention relates, according to a fourth aspect of the present invention, to protective materials, in particular for the civilian or military sector, which have been produced using an above-defined activated carbon according to the invention and/or which comprise an above-defined activated carbon according to the invention.

In addition, the present invention also makes available, according to a fifth aspect of the present invention, filters and filter materials, in particular for the removal of harmful substances, odorous substances and poisons of all types, in particular from streams of air and/or gas, e.g. ABC protective mask filters, odor filters, wide-area filters, air filters, in particular filters for purifying the air of a room, adsorptive support structures and filters for the medical sector, produced using an above-defined activated carbon according to the invention and/or comprising an above-defined activated carbon.

The filters and filter materials of the invention can have a variable structure:

Thus, according to the invention, the activated carbon can be self-supporting or be present in the form of an in particular loose bed.

However, as an alternative, the activated carbon according to the invention can have been applied to a support material.

In this context, the support material according to the invention can be gas-permeable, in particular air-permeable.

In this case, the support material according to the invention can have a gas permeability, in particular air permeability, of at least $10 \, l \cdot m^{-2} \cdot s^{-1}$, in particular at least $30 \, l \cdot m^{-2} \cdot s^{-1}$, preferably at least $50 \, l \cdot m^{-2} \cdot s^{-1}$, particularly preferably at least $100 \, l \cdot m^{-2} \, s^{-1}$, very particularly preferably at least $500 \, l \cdot m^{-2} \cdot s^{-1}$, and/or a gas permeability, in particular air permeability, of up to $10\,000 \, l \cdot m^{-2} \cdot s^{-1}$, in particular up to $20\,000 \, l \cdot m^{-2} \cdot s^{-1}$, at a flow resistance of 127 Pa.

In addition, it can in this context likewise be provided, for the purposes of the present invention, for the support material to have a three-dimensional structure. In this context, the support material can be configured as a preferably open-pored foam, particularly preferably polyurethane foam.

However, as an alternative, the support material can have a two-dimensional and/or sheet-like structure. In this respect, the support material can be configured as a preferably textile sheet.

In the case of the two-dimensional configuration of the support material, it is possible, according to the invention, for the support material to be configured as a textile sheet, preferably an air-permeable textile material, preferably a woven fabric, drawn-loop knit, formed-loop knit, lay-up or textile composite, in particular nonwoven. In particular, the support material can have a weight per unit area of from 5 to 1000 $g/m^2$, in particular from 10 to 500 $g/m^2$, preferably from 25 to 450 $g/m^2$.

In particular, in the case of a two-dimensional configuration of the support material, the support material can be a textile sheet containing or consisting of natural fibers and/or synthetic fibers (chemical fibers). In this context, the natural fibers can be selected from the group consisting of wool fibers and cotton fibers (CO). In addition, the synthetic fibers can be selected from the group consisting of polyesters (PES); polyolefins, in particular polyethylene (PE) and/or polypropylene (PP); polyvinyl chlorides (CLF); polyvinylidene chlorides (CLF); acetates (CA); triacetates (CTA); polyacrylic (PAN); polyamides (PA), in particular aromatic, preferably flame-resistant polyamides; polyvinyl alcohols (PVAL); polyurethanes; polyvinyl esters; (meth)acrylates; polylactic acids (PLA); activated carbon; and also mixtures thereof.

When a support material is used, preference is given according to the invention to the activated carbon being fixed at and/or on the support material, preferably by means of adhesive bonding, in particular by means of an adhesive, or as a result of intrinsic tack or intrinsic adhesion.

Finally, the present invention relates, according to a sixth aspect of the present invention, to the process of the invention for purifying and/or treating gases, in particular for the removal of undesirable, in particular environmentally damaging, health-endangering or toxic substances or gases from gas streams, characterized in that the gas stream to be purified and/or treated is brought into contact with an activated carbon of the type described above.

In this context, the process of the invention is used, in particular, for the treatment and/or provision of clean room atmospheres, in particular for the electrical industry, in particular for semiconductor or chip production.

As a result, the present invention has made it possible for the first time to make available a high-performance activated carbon which has an excellent sorptive performance on the basis of a targeted combination of chemisorptive and physisorptive properties and is provided in a targeted way with a metal component comprising an ionic liquid (IL). Likewise, the present invention for the first time makes available an efficient process for producing such materials. Materials of this type, which combine all the abovementioned properties, have hitherto not been produced or described according to the prior art.

The invention makes available a high-performance activated carbon which has reactive and catalytic properties and can also be produced inexpensively and has a broad-band absorption spectrum. In particular, a possible use is in single filters or combination filters, in particular on the basis of ABEK filters and/or in the context of ABC protection. Use in the form of loose beds or mixed beds can likewise be realized.

In the context of the present invention, it is likewise possible for the activated carbon of the invention provided with the reactive or catalytic constituents to be combined with at least one further, additional sorption medium or adsorbent, in particular on the basis of activated carbon, i.e. the activated carbon of the invention can be used together with a further sorption medium or adsorbent, in particular on an activated carbon basis, for example in the production of sorption filter materials and the like. Thus, for example, the activated carbon of the invention can be combined with an ABEK activated carbon which is well-known to those skilled in the art, in particular in order to supplement or widen the sorption spectrum.

The provision of the activated carbon with metal-containing ionic liquids (IL), in particular ionic liquids containing metal ions, to give it reactive or catalytic properties makes it possible to degrade or neutralize chemical and/or biological poisons and/or harmful substances and also undesirable or harmful or toxic gases. In addition, the modification of the activated carbon can in this way be adjusted so that the resulting activated carbon according to the invention also has a biostatic and/or biocidal action, in particular a bacteriostatic or bacteriocidal and/or virustatic or virucidal and/or fungistatic or fungicidal action.

In the following, the present invention is illustrated with the aid of drawings or figures depicting preferred working examples. In conjunction with the explanation of these preferred working examples of the present invention, which do not, however, restrict the present invention in any way, further advantages, properties, aspects and features of the present invention are also described.

Figure 2:
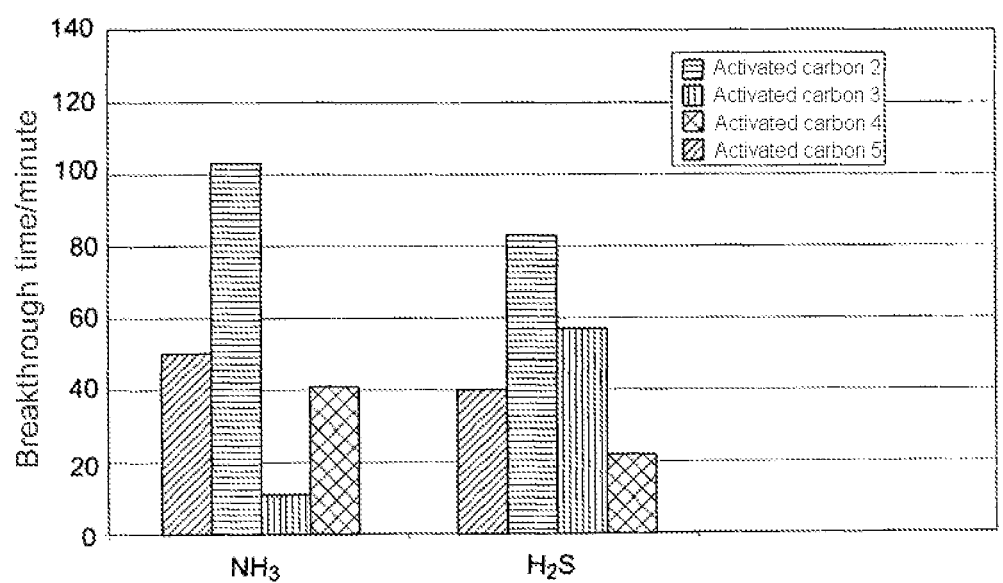
FIG. 2 provides graphical depictions with a comparison of the breakthrough times under ABEK conditions for the gases ammonia ($NH_3$) and hydrogen sulfide ($H_2S$), with the activated carbon of the invention based on a metal component comprising a metal-containing ionic liquid (IL) being represented by the activated carbon 2; the activated carbons 3 to 5 are activated carbons which are not according to the invention.
Figure 3:
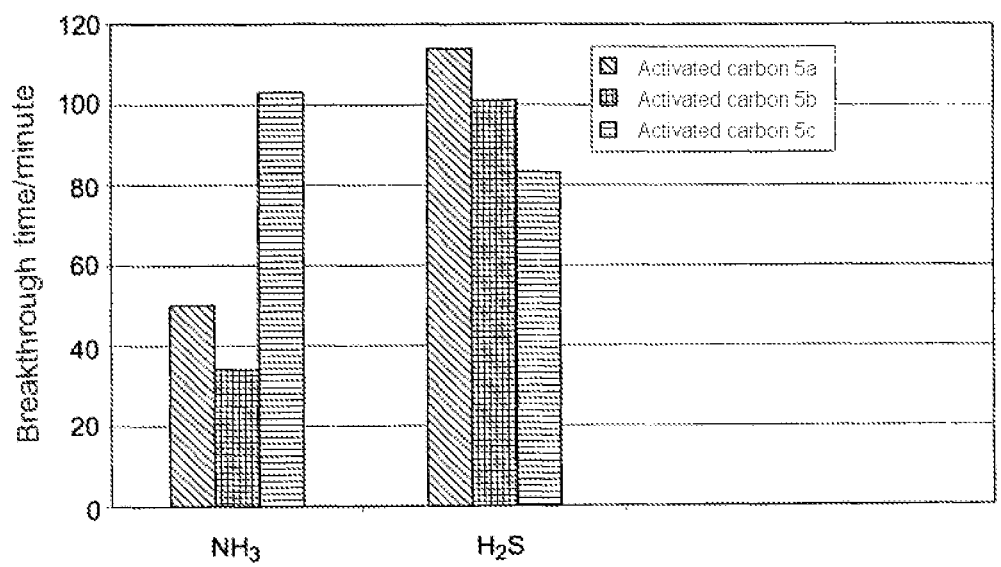
FIG. 3 provides graphical depictions with a comparison of the breakthrough times under ABEK conditions for three activated carbons according to the invention (activated carbons 5a, 5b and 5c) having differing compositions of the metal components using different ionic liquids (IL), metal salts and molar ratios of ionic liquid (IL) to metal salt.
Figure 4:
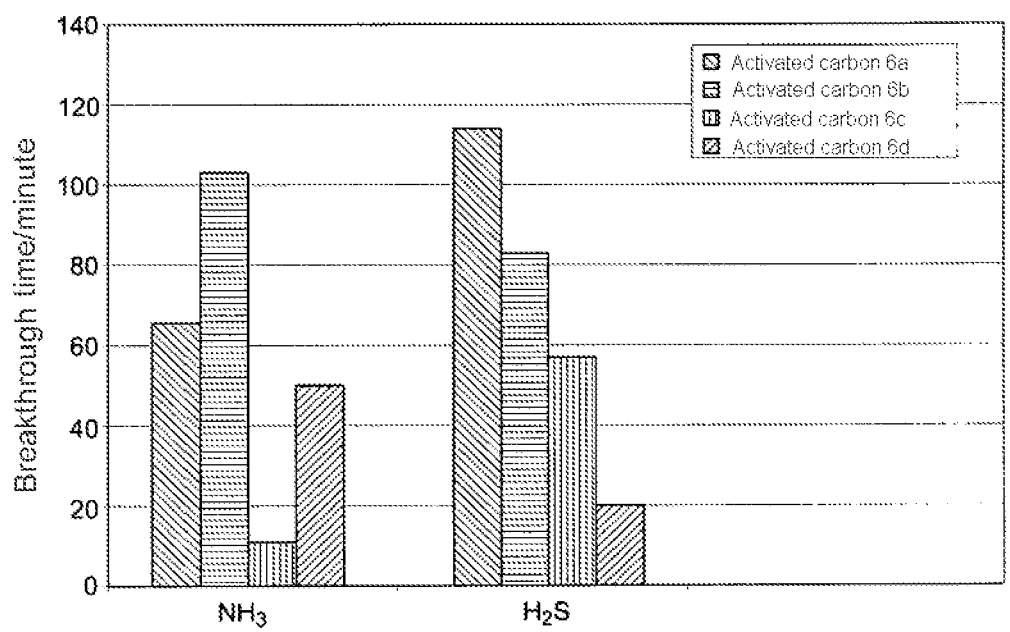
FIG. 4 provides graphical depictions and comparison of the breakthrough times of activated carbons according to the invention (activated carbon 6a and activated carbon 6b) compared to activated carbons which are not according to the invention (activated carbon 6c and activated carbon 6d).

The figures show:

FIG. 1 a graphical depiction of the breakthrough curves of ammonia ($NH_3$) for beds of an activated carbon according to the invention (activated carbon 1) which has a metal component comprising a metal-containing ionic liquid (IL) in comparison with a noninventive activated carbon (activated carbon 1') having a conventional metal salt impregnation;

FIG. 2 graphical depictions with a comparison of the breakthrough times under ABEK conditions for the gases ammonia ($NH_3$) and hydrogen sulfide ($H_2S$), with the activated carbon of the invention based on a metal component comprising a metal-containing ionic liquid (IL) being represented by the activated carbon 2; the activated carbons 3 to 5 are activated carbons which are not according to the invention;

FIG. 3 graphical depictions with a comparison of the breakthrough times under ABEK conditions for three activated carbons according to the invention (activated carbons 5a, 5b and 5c) having differing compositions of the metal components using different ionic liquids (IL), metal salts and molar ratios of ionic liquid (IL) to metal salt;

FIG. 4 graphical depictions and comparison of the breakthrough times of activated carbons according to the invention (activated carbon 6a and activated carbon 6b) compared to activated carbons which are not according to the invention (activated carbon 6c and activated carbon 6d).

FIG. 1 shows a schematic depiction and a comparison of the breakthrough curves of ammonia ($NH_3$) of an activated carbon according to the invention (activated carbon 1) compared to an activated carbon which is not according to the invention (activated carbon 1'). The activated carbons in question were each used as beds. In the case of the activated carbon according to the invention, a metal component containing 1-ethyl-3-methylimidazolium chloride as ionic liquid (IL) and $CuCl_2$ as metal compound was used. The molar ratio of ionic liquid (IL) to the metal compound was [1:1.3] at a degree of fill of the pores α=0.2. Thus, [EMIM]Cl—$CuCl_2$ (1:1.3) was used as metal component with α=0.2 based on the activated carbon of the invention. As activated carbon, use was made of a commercial activated carbon marketed by Blücher GmbH and having a high microporosity and mesoporosity. As activated carbon which was not according to the invention, use was made of an activated carbon which had an identical porosity and had conventional $CuCl_2$ salt impregnation. FIG. 1 shows the significantly greater breakthrough times obtained for $NH_3$ in the case of the activated carbon 1 according to the invention. The activated carbon according to the invention thus displays significantly improved performance compared to activated carbons having conventional impregnation. The breakthrough curves were recorded at the following parameters or settings: gas humidity rF=25%; Cu loading=0.001567 mol/g; $T_{adsorber}$=30° C.; $p_{adsorber}$=1.21 bar; $h_{bed}$=2 cm; nitrogen volume flow=325.61 $ml_N$/min; $NH_3$ volume flow=0.33 $ml_N$/min; $NH_3$ detection limit c=39 $ppm_v$. The ordinate shows the ratio of input concentration and output concentration of ammonia.

The depiction in FIG. 2 shows a schematic comparison of the breakthrough times of the gases ammonia ($NH_3$) and hydrogen sulfide ($H_2S$) under ABEK conditions of an activated carbon according to the invention (activated carbon 2) compared to activated carbons which are not according to the invention (activated carbons 3 to 5). The activated carbon according to the invention is an activated carbon marketed by Blücher GmbH and having a high microporosity and mesoporosity, which was provided with a metal component based on [EMIM]Cl—$CuCl_2$. Activated carbon 3 is a comparative activated carbon with conventional military impregnation, activated carbon 4 is a conventional activated carbon with ABEK impregnation and activated carbon 5 is a conventional activated carbon with ABEK impregnation. The bar chart shows that significantly greater breakthrough times both for ammonia ($NH_3$) and for hydrogen sulfide ($H_2S$) result in the case of the activated carbon according to the invention. The activated carbon according to the invention thus has very good sorption performances, especially in respect of $NH_3$ and $H_2S$.

The corresponding values were determined at the following parameters or settings: a) breakthrough measurements for $NH_3$: gas humidity rF=85±5%; $T_{adsorbent}$=30° C.; $h_{bed}$=2 cm; amount of sample: about 2 g; $NH_3$ detection limit c=39 $ppm_v$; $C_{NH3}$=1000 ppm of $NH_3$ ($N_2$); b) breakthrough measurements for $H_2S$: gas humidity rF=70%; $T_{adsorbent}$=20° C.; $h_{bed}$=2 cm; $d_{bed}$=50 mm; $C_{H2S}$=1000 ppm of $H_2S$; $H_2S$ flow velocity=0.1 m/s; $H_2S$ breakthrough=10 ppm. The abovementioned parameters were also used in the working examples or experiments as per FIG. 3 and FIG. 4.

The depiction in FIG. 3 in turn shows a comparison of the breakthrough times of three different activated carbons according to the invention in respect of the sorption of ammonia ($NH_3$) and hydrogen sulfide ($H_2S$). The activated carbon 5a according to the invention is an activated carbon marketed by Blücher GmbH and having a high microporosity and mesoporosity, which was provided with a metal component based on 1-ethyl-3-methylimidazolium acetate as ionic liquid (IL) and zinc acetate as metal compound or metal salt. The abovementioned components were used in a molar ratio of [1:1]. The degree of fill α of the pores was 0.2 ([EMIM]Ac—$ZnAc_2$ (1:1 molar) with α=0.2). The activated carbon 5b according to the invention is an activated carbon which is likewise marketed by Blücher GmbH and has a high microporosity and mesoporosity, which likewise contained 1-ethyl-3-methylimidazolium acetate as metal component. The degree of fill α of the pores was likewise 0.2. As metal compound or metal salt, use was made of tin acetate in a molar ratio of [1:1] ([EMIM]Ac—$SnAc_2$ (1:1 molar) with α=0.2). As regards activated carbon 5, an activated carbon marketed by Blücher GmbH and having a high microporosity and mesoporosity was likewise used. The metal component was based on 1-ethyl-3-methylimidazolium chloride as ionic liquid (IL) and copper chloride ($CuCl_2$) as metal compound or metal salt. The molar ratio was [1:1.3]. In the case of activated carbon 5c, the degree of fill α of the pores was also set to 0.2 ([EMIM]Cl—$CuCl_2$ (1:1.3) with α=0.2). All activated carbons according to the invention display sorption performances significantly above the standardized requirements both in respect of ammonia ($NH_3$) and in respect of hydrogen sulfide ($H_2S$). Particularly good results in respect of $NH_3$ are achieved using activated carbon 5c, while activated carbon 5a according to the invention gives the best results in respect of the sorption of $H_2S$. Overall, the sorption behavior of all activated carbons according to the invention can be classified as excellent.

Finally, the depiction in FIG. 4 shows a graphical depiction with a comparison of the breakthrough times in respect of ammonia ($NH_3$) and hydrogen sulfide ($H_2S$) of activated carbons 6a and 6b according to the invention compared to activated carbons 6c and 6d which are not according to the invention. In the case of the activated carbon 6a according to the invention, 1-ethyl-3-methylimidazolium acetate was used as ionic liquid (IL) for the metal component and zinc acetate was used as metal compound or metal salt ([EMIM]Ac-$ZnAc_2$). In the case of the activated carbon 6b according to the invention, 1-ethyl-3-methylimidazolium chloride was used as ionic liquid for the metal component and copper chloride ($CuCl_2$) was used as metal compound or metal salt ([EMIM]Cl—$CuCl_2$). The noninventive activated carbon 6c was an activated carbon with military impregnation and the noninventive activated carbon 6d was an ABEK activated carbon. FIG. 4 shows that both the activated carbon 6a according to the invention and the activated carbon 6b according to the invention had significantly better sorption properties both in respect of ammonia ($NH_3$) and in respect of hydrogen sulfide ($H_2S$) compared to the activated carbons of the prior art, which shows up in significantly greater breakthrough times.

The studies described demonstrate the excellent sorptive properties of the activated carbon of the invention, in particular also in respect of a wide bandwidth of the substances and harmful gases to be sorbed.

The figures explained above will once again be explained in more detail in the context of the working examples according to the invention.

Further embodiments, altered versions, variations, modifications, special features and advantages of the present invention will readily be able to be recognized and realized by a person skilled in the art on reading the description, without going outside the scope of the present invention.

The present invention is illustrated by the following working examples, which are, however, not intended to restrict the present invention in any way.

WORKING EXAMPLES

1. Production of the Activated Carbon Modified According to the Invention
a) Production of the Metal Component Based on an Ionic Liquid (IL) and a Metal Compound
Synthesis of the Chlorometalate/Ionic Liquid (IL) Melts
All syntheses of the metal component (=chlorometalate/ionic liquid (IL)) were carried out under an inert gas atmosphere.

For the production of the metal components used, in particular those based on chlorometalate/ionic liquid (IL) melts, the masses to be weighed out were firstly calculated for the respective ionic liquid (IL) and copper(II) chloride ($CuCl_2$).

The appropriate amount of ionic liquid (IL) was then introduced into a dry Schlenk flask.

The structural formulae of the ionic liquids (IL) used in this context, namely 1-ethyl-3-methylimidazolium chloride ([EMIM]Cl), 1-butyl-3-methylimidazolium chloride ([BMIM]Cl) and 1-octyl-3-methylimidazolium chloride ([OMIM]Cl), are shown in the figure below.

The molar proportion of $CuCl_2$ calculated for producing the respective molar ratio of ionic liquid (IL) to $CuCl_2$ was subsequently weighed in.

The melt was then stirred in a Schlenk flask for 24 hours under an inert gas atmosphere at T=100° C. in an oil bath at a stirrer speed of 300 $min^{-1}$.

The mixture was then dried overnight under a high vacuum.

The figure below shows the ionic liquids used for producing the chlorometalate/ionic liquid (IL) melts in the working examples:

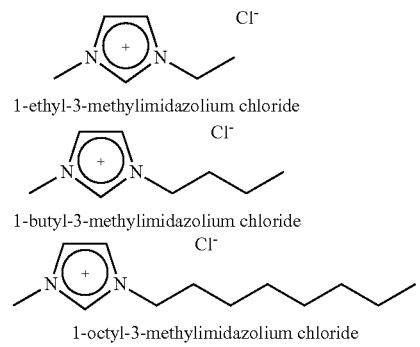

1-ethyl-3-methylimidazolium chloride 1-butyl-3-methylimidazolium chloride 1-octyl-3-methylimidazolium chloride Table 1 below lists the melts synthesized and their molar compositions.

TABLE 1

| Chlorometalate/ionic liquid (IL) melts synthesized | |
|---|---|
| Ionic liquid (IL) | Molar ratio [ionic liquid (IL):$CuCl_2$] |
| [EMIM]Cl | [1:1]; [1:1.3] |
| [BMIM]Cl | [1:1] |
| [OMIM]Cl | [1:1]; [1:1.3]; [1:1.6] |

To calculate the volumes of ionic liquid (IL) to be used for the subsequent production of the activated carbon modified according to the invention, the densities of the melts produced were measured in a helium pycnometer (Pycnomatic ATC from Thermo Scientific).

The densities of the melts are listed in table 2 below.

TABLE 2

| Results of the density measurements in a helium pycnometer at T = 20° C. | |
|---|---|
| Melt | Density/g $cm^{-3}$ |
| [EMIM]Cl—$CuCl_2$ [1:1] | 1.8137 |
| [EMIM]Cl—$CuCl_2$ [1:1.3] | 1.8090 |
| [BMIM]Cl—$CuCl_2$ [1:1] | 1.5846 |
| [OMIM]Cl—$CuCl_2$ [1:1] | 1.3050 |
| [OMIM]Cl—$CuCl_2$ [1:1.3] | 1.5085 |
| [OMIM]Cl—$CuCl_2$ [1:1.6] | 1.6607 | b) Provision of the Activated Carbon with the Metal Component Based on an Ionic Liquid (IL) and a Metal Compound
Preparation of the Activated Carbon Modified According to the Invention/Production with Introduction of Ultrasound:
A microporous/mesoporous activated carbon or a mesoporous activated carbon was used as support material for producing the activated carbon according to the invention. The activated carbons used according to the invention can be obtained under the product number 101408 (microporous/mesoporous activated carbon) and 101412 (mesoporous activated carbon) from Blücher GmbH, Erkrath (Germany).

Impregnation of the activated carbon adsorbents with the chlorometalate/ionic liquid (IL) melts was carried out with introduction of ultrasound. Improved distribution of the metal component in the fine pore structures of the activated carbon support was able to be ensured by the non-steady-state or discontinuous introduction of energy by the ultrasonic probe.

To produce the activated carbon of the invention, the appropriate amount of metal component necessary for setting a particular degree of fill α of the pores in a defined amount of the activated carbon absorbent was firstly calculated. The degree of fill α of the pores was calculated according to the formula [α=$V_{IL}$/(Vpore·$m_{support}$)]. In the abovementioned formula, "$V_{IL}$" is the volume of the ionic liquid (IL) used, "$m_{support}$" is the mass of the activated carbon to be used and "$V_{pore}$" is the specific (mass-based) pore volume of the activated carbon.

The respective metal component based on the chlorometalate/ionic liquid (IL) melt was firstly weighed into a dry Schlenk flask and dissolved in or diluted with ethanol (absolute). The dissolution procedure was carried out by stirring at a stirring speed of $v_{stirrer}$=200 $min^{-1}$ under an inert gas atmosphere on a magnetic stirrer. The duration of this procedure was in the range from t=10 min and a number of hours and was dependent on the metal component to be dissolved. The previously calculated amount of activated carbon absorbent was then introduced into the solution. The mixture was stirred for a further 15 minutes and subsequently placed for 2 hours in a water bath with an ultrasonic probe dipped in.

In this context, the ultrasound-assisted production of the activated carbon of the invention was carried out using an apparatus which comprised a water bath, a Schlenk synthesis flask and an ultrasonic probe (UP200S (200 W, 24 kHz) from Hielscher). The Schlenk flask filled with the synthesis batch and the ultrasonic probe were dipped into the water bath. The ultrasonic probe emitted pulses of ultrasound with a setting of 50% amplitude at intervals of t=0.5 s.

After impregnation of the activated carbon support, the solvent ethanol was separated off on a rotary evaporator at T=40° C. and p=175 mbar, and subsequent final drying was carried out overnight at T=60° C. under a high vacuum on an oil bath.

2. Production of Noninventive Activated Carbon Based on Conventional $CuCl_2$ Salt Impregnation In addition to the activated carbons modified according to the invention, impregnations of the activated carbon supports with pure $CuCl_2$ salt were also produced. The preparation was carried out in a manner analogous to the above-described production of the activated carbon of the invention. The proportion of $CuCl_2$ to be weighed out was based on the equivalent copper metal proportion of the system AC (micro/meso)+[EMIM]Cl—$CuCl_2$ (1:1.3) α=0.2 per gram of AC (AC=activated carbon) (corresponding to 0.001567 mol $g^{-1}$ of Cu on activated carbon support) which was employed for this purpose.

Tables 8 and 9 below summarize all activated carbons according to the invention produced with ultrasound assistance and $CuCl_2$-impregnated activated carbon absorbents (comparison).

3. Plant Structure and Measurement of Breakthrough Curves in the Plant for Continuous Adsorption of Harmful Gases The breakthrough curves of ammonia for activated carbon systems according to the invention were firstly measured in a plant for continuous ammonia adsorption using a variably humidified carrier gas stream. The operating parameters set in the plant reproduce the ambient conditions for possible use of the activated carbon of the invention in protective breathing masks very realistically.

The operating parameters and also the plant structure and the experimental procedure for the continuous gas adsorption are presented in more detail below:

a) Structure of the Plant for Continuous Ammonia Adsorption

The plant for the continuous adsorption of ammonia using a variably humidified gas stream, in particular the plant structure for the irreversible adsorption of ammonia from a variably humidified stream of nitrogen, had mass flow meters or mass flow control devices (Mass Flow Controller or MFC) (1) for $NH_3$ and (2) for $N_2$; (3) a gas saturation unit; (4) a thermostat; (5) a humidity measurement unit (rHI-TI-1 or HND-FF31 from Huber); (6) a bypass and (7) adsorber.

The Mass Flow Controllers (MFCs) (1) and (2) enabled a defined concentration of 1000 $ppm_v$ of ammonia ($NH_3$) in a nitrogen carrier gas stream to be set. The gas mixture was alternatively passed dry or humidified through the plant by means of variable valve settings. To humidify the gas mixture, the nitrogen stream was fed into the saturation unit (3). The gas saturator is based on the principle of a conventional gas wash bottle but has a double wall. This makes it possible to control the temperature of the interior water column through which the nitrogen flows by means of a thermostat circuit or cryostat circuit. To set low gas humidities, low water temperatures are necessary. These were achieved by use of a thermostat/cryostat (Ecoline Staredition RE 106 from Lauda). Depending on the temperature set, a certain proportion of the twice-distilled water is transferred into the gas phase and conveyed along by the stream of nitrogen. The desired relative humidity of the gas stream, which was detected in a reservoir (5) by means of the humidity sensor or humidity measurement unit, was set in this way. After introduction of the ammonia, the gas mixture was conveyed variably past the adsorber (7) by means of the bypass line (6) or passed through the adsorber (7) at the beginning of the experiment. The gas stream was then conveyed to the downstream analytical facilities. These are described in more detail in the Analysis section.

The operating parameters set for the continuous gas adsorption always remain the same in order to simulate the ambient conditions in breathing protection masks. To give a better overview, these are listed in table 3 below.

TABLE 3

| Operating parameters of the plant for the continuous adsorption of ammonia gas | |
|---|---|
| Volume flow of $N_2$/$ml_N$ $min^{-1}$ | 325.61 |
| Volume flow of $NH_3$/$ml_N$ $min^{-1}$ | 0.33 |
| Inflow velocity into bed/cm $s^{-1}$ | 2 |
| Bed height/cm | 2 |
| Diameter of bed/cm | 1.8 |
| Plant pressure/bar | 1.21 |

The temperature at which the experiment was carried out was generally 30° C., with an increase to T=85° C. being effected to carry out the reversibility experiments.

In the course of the optimization of the activated carbon of the invention, in particular for ammonia adsorption, the relative gas humidity was varied from rF=0% to rF=85%. Calculation of the relative humidities under adsorber conditions (p=1.21 bar; T=30° C.) was carried out by means of the Clausius-Clapeyron equation. The temperature in the interior of the saturator was measured by means of a temperature sensor.

The temperatures set in the thermostat/cryostat required in order to set the relative gas humidity are shown in table 4 below.

TABLE 4

Setting of the temperature in the thermostat/cryostat
for varying the relative humidity

| Temperature in thermostat/cryostat/° C. | Relative humidity/% |
|---|---|
| 13.0 | 25 |
| 21.9 | 50 |
| 27.5 | 70 |
| 33.0 | 85 | b) Experimental Procedure for Measuring the Continuous Adsorption of Ammonia

The plant was firstly flushed with a stream of dry $N_2$ gas via the bypass. During this, the adsorber was charged with the bed of activated carbon to be measured. In order for the adsorber layer to be present as packing, the bed of activated carbon was installed between two thin glass wool layers on the metal frit in the reactor. The bed was then flushed with the stream of dry nitrogen by setting valves located in predetermined positions in the apparatus used until no more solvent residues could be detected.

The valves were then again switched over to the bypass setting in order to set steady-state experimental conditions. Here, in the case of humid measurement, the carrier gas nitrogen was passed at a volume flow of 325.61 $ml_N$ $min^{-1}$ through the saturation unit and, as described above, humidified. Furthermore, the MFC for introduction of $NH_3$ was set to a volume flow of 0.33 $ml_N$ $min^{-1}$. After mixing of the two gas components, the ammonia concentration in the bypass stream was 1000 $ppm_v$.

As soon as steady-state operating conditions had been established, the gas mixture was passed through the adsorber by switching over the valves with an inflow velocity into the bed of v=2 cm $s^{-1}$. After detection of the breakthrough curve, the ammonia gas stream was switched off. In addition, the bed of activated carbon was flushed with a stream of dry nitrogen. After flushing of the adsorber, the plant was switched over to the bypass again and this was flushed with dry nitrogen. The adsorber could subsequently be emptied and refilled.

c) Reversibility Experiments

When carrying out reversibility experiments, the introduction of ammonia was stopped and the adsorber temperature was increased after the saturation concentration had been reached. To test for reversible ammonia adsorption in the bed, the adsorber was heated to an actual value of about $T_{adsorber}$=85° C. The reversibility experiment was stopped as soon as ammonia was no longer detectable in the gas stream flowing out from the bed. The further steps for flushing the reactor and the bypass were carried out as described above.

Analysis

Density Measurements:

The density measurements on the metal component (metal-containing ionic liquid (IL)) at T=20° C. were carried out under a helium atmosphere in a Pycnomatic ATC pycnometer from Thermo Scientific.

on-Line Ammonia Detection:

To determine the breakthrough curves of ammonia, the gas components leaving the adsorber were continuously measured by means of a gas chromatograph (CP-3800 from Varian). Separation of the gas components was effected in a capillary column (WCOT Fused silica (60 m×0.32 mm) CP-Volamine from Varian). The detection limit for the ammonia concentration was 39 $ppm_v$.

Thermogravimetric Analyses:

The thermogravimetric measurements were carried out using the Setsys-1750 CS Evolution instrument from Setaram Instrumentation KEP Technologies. The samples were heated over the temperature range from T=30° C. to T=950° C. Furthermore, long-term experiments using activated carbons were carried out for t=10 h at T=100° C. or 200° C. The decomposition temperatures of the metal components used were above 200° C. They also displayed very high long-term thermal stabilities at the temperatures at which measurements were carried out.

Sorption Measurements:

The determination of the BET surface areas and pore volumes of the activated carbons was carried out in a Quadrasorb SI (Automated Surface Area & Pore Size Analyzer) instrument from Quantachrome Instruments.

Specifications of the Activated Carbon Adsorbents, Chemicals and Instruments Used:

TABLE 5

Specifications of the activated carbon adsorbents
from Blücher which were used

| Measurement parameter | Meso | Meso/micro |
|---|---|---|
| $\rho$/g $ml^{-1}$ | 2.30797 | 2.22126 |
| $\rho_{bed}$/g $ml^{-1}$ | 0.411 | 0.412 |
| $S_{BET}$/$m^2$ $g^{-1}$ | 1698.51 | 2004.96 |
| $V_P$/$cm^3$ $g^{-1}$ | 1.1429 | 1.071 |
| $S_{micro}$/$m^2$ $g^{-1}$ | 1508 | 1757 |
| $V_{P.\ micro}$/$cm^3$ $g^{-1}$ | 0.6816 | 0.7702 |
| $Dd_P$/Å | 27.5 | 24.7 |

TABLE 6

Specifications of the chemicals used

| Name | Purity | Manufacturer | Catalog number |
|---|---|---|---|
| Ammonia | 3.8 | Linde | — |
| [BMIM]Cl | >98% | Aldrich-Chemistry | 94128 |
| [EMIM]Cl | Synthesis grade | Merck | 4.90054.0100 |
| [OMIM]Cl | Synthesis grade | Merck | 4.90056.1000 |
| Ethanol, absolute | >99.9% | Sigma-Aldrich | 34963 |
| Copper(II) chloride | >98% | Merck | 8.18247.0500 |

TABLE 7

Specifications of important plant components

| Name | Type | Manufacturer | Specification |
|---|---|---|---|
| MFC-$NH_3$ | F-200CV-002-RGD-11-E | Bronckhorst | 0.02-1 $ml_N min^{-1}$ |
| MFC-$N_2$ | F-201CV-500RGD-33-V | Bronckhorst | 8-400 $ml_N min^{-1}$ |
| GC column $NH_3$ | WCOT Fused silica; coating CP-volamine | Varian | CP7448 60 m × 0.32 mm |
| Humidity sensor | HND-FF31 | Kobold | 0.0-100.0% rF, |
| Thermo/cryostat | Ecoline Star edition RE106 | Lauda | — | d) Experimental Results/Breakthrough Curves

1. Breakthrough curves of $NH_3$ in beds of activated carbon according to the invention ([EMIM]Cl—$CuCl_2$ (1:1.3) $\alpha$=0.2 on activated carbon adsorbents (micro/meso) were firstly recorded at varying relative gas humidity (with $T_{adsorber}$=30° C., $p_{adsorber}$=1.21 bar, $h_{bed}$=2 cm, volume flow ($N_2$)=325.61 $ml_N$ $min^{-1}$, volume flow ($NH_3$)=0.33 $ml_N$ $min^{-1}$, detection limit $c_{NH3}$=39 $ppm_v$).

Variation of the relative gas humidity for the activated carbon system with [EMIM]Cl—CuCl$_2$ (1:1.3) α=0.2 on activated carbon adsorbents having a high microporosity and mesoporosity at relative humidities of rF=25%, 50% and 70% showed a significant improvement in the breakthrough times. The breakthrough times measured were about 30% above those at relative gas humidities of rF=0% and 85%. The breakthrough times in the humidity range from rF=25% to rF=70% are relatively similar. Since these are the usual atmospheric humidities in normal use of breathing protection masks, the activated carbon of the invention can be said to have a very good stability.

2. Furthermore, breakthrough curves of NH$_3$ in beds of activated carbons according to the invention ([OMIM]Cl—CuCl$_2$ (1:1.3) on various porous activated carbon adsorbents were determined at varying degrees of fill α of the pores (with $T_{adsorber}$=30° C., $p_{adsorber}$=1.21 bar, rF=85%, $h_{bed}$=2 cm, volume flow (N$_2$)=325.61 ml$_N$ min$^{-1}$, volume flow (NH$_3$)=0.33 ml$_N$ min$^{-1}$, detection limit $c_{NH3}$=39 ppm$_v$).

It could be seen from the resulting breakthrough curves for that high loadings with the metal component or degrees of fill of the pores of α=0.4, mesoporous activated carbon adsorbents are better suited as support materials than microporous/mesoporous activated carbon supports. At the same degree of fill of the pores of α=0.4, an about 26% higher breakthrough time of about 370 minutes is found for the mesoporous activated carbon support. In the case of low degrees of fill of the pores of α=0.2, no serious difference in respect of the breakthrough times between the activated carbon absorbents of the types in question is found.

3. In addition, reversibility experiments using adsorbed and desorbed NH$_3$ mass streams were carried out in the measurement of the activated carbon system of the invention ([EMIM]Cl—CuCl$_2$ (1:1.3) α=0.2 on activated carbon adsorbents (micro/meso)) (with the following parameters: 1.) adsorption: $T_{adsorber}$=30° C., $p_{adsorber}$=1.21 bar, rF=50%, $h_{bed}$=2 cm, volume flow (N$_2$)=325.61 ml$_N$min$^{-1}$, volume flow (NH$_3$)=0.33 ml$_N$ min$^{-1}$, detection limit $c_{NH3}$=39 ppm$_3$; 2.) desorption: $T_{adsorber}$=85° C., $p_{adsorber}$=1.23 bar, rF=50%, $h_{bed}$=2 cm, volume flow (N$_2$)=325.61 ml$_N$ min$^{-1}$, detection limit $c_{NH3}$=39 ppm$_v$).

The reversibility tests were carried out to examine the irreversible gas adsorption of ammonia in the bed. Here, the adsorbed amount of ammonia in the bed during the adsorption experiment and the amount of ammonia desorbed from the bed during the reversibility experiment were plotted against time. Integration of the two curves enabled the amounts of ammonia taken up by the bed during adsorption and the amounts of ammonia desorbed during the reversibility experiment to be calculated.

The total amount of adsorbed NH$_3$ in the activated carbon system according to the invention ([EMIM]Cl—CuCl$_2$ (1:1.3) α=0.2 on activated carbon adsorbents (micro/meso)) was 225 mg of NH$_3$. Of this, 128 mg of NH$_3$ were desorbed again during the reversibility experiment. Thus, about 43% of the NH$_3$ gas were irreversibly bound in the material during the adsorption experiment, which represents an excellent value.

The irreversible or chemisorptive binding of ammonia is, without wishing to be tied to this theory, due to a complex formation reaction. The complex formed is a copper(II) tetraammine complex which is formed by bonding of the ammonia to the Cu species present in the metal component.

4. Comparison of the activated carbon of the invention with activated carbon based on a conventional CuCl$_2$ impregnation:

FIG. 1 shows a comparison of the breakthrough curves of NH$_3$ in beds of activated carbon according to the invention ([EMIM]Cl—CuCl$_2$ (1:1.3) α=0.2 on activated carbon adsorbents (micro/meso)) with conventional CuCl$_2$ salt impregnations on activated carbon adsorbents (micro/meso) (with the following parameters: gas humidity rF=25%; Cu loading: 0.001567 mol g$^{-1}$; $T_{adsorber}$=30° C., $p_{adsorber}$=1.21 bar, $h_{bed}$=2 cm, volume flow (N$_2$)=325.61 ml$_N$ min$^{-1}$, volume flow (NH$_3$)=0.33 ml$_N$ min$^{-1}$, detection limit CNH3=39 ppm$_v$).

Comparison of the Cu-based activated carbon according to the invention with the conventional impregnations of the activated carbon adsorbents with pure CuCl$_2$ salt shows, as depicted in FIG. 1, a significant increase in the breakthrough times at a relative gas humidity of rF=25% for the system according to the invention compared to the pure metal salt impregnation.

Further measurements at a relative gas humidity of rF=85% also display better breakthrough times for the systems according to the invention.

Overall, the results show the considerably improved performance of the activated carbon of the invention compared to conventional copper metal salt impregnations, and this independently of the prevailing atmospheric humidity.

In summary, the fundamental experiments show the excellent adsorptive properties of the activated carbons of the invention based on the combination of chemisorption and physisorption, associated with very good breakthrough times and improved desorption behavior.

4. Further Embodiments of the Loading of Copper on Activated Carbon Absorbents

TABLE 8

Activated carbon systems according to the invention produced and conventional CuCl$_2$ salt impregnation on microporous/mesoporous activated carbon adsorbents using ultrasound treatment
Activated carbon support (microporous/mesoporous)

| AC impregnation | Degree of fill α of the pores (ml of IL/ml of pore) | n of Cu (mol)/m of AC (g) |
| --- | --- | --- |
| [EMIM]Cl—CuCl$_2$ (1:1) | 0.2 | 0.001382 |
| [EMIM]Cl—CuCl$_2$ (1:1) | 0.4 | 0.002764 |
| [EMIM]Cl—CuCl$_2$ (1:1.3) | 0.2 | 0.001567 |
| [EMIM]Cl—CuCl$_2$ (1:1.3) | 0.4 | 0.003135 |
| [BMIM]Cl—CuCl$_2$ (1:1) | 0.4 | 0.002196 |
| [OMIM]Cl—CuCl$_2$ (1:1) | 0.4 | 0.001531 |
| [OMIM]Cl—CuCl$_2$ (1:1.3) | 0.2 | 0.001036 |
| [OMIM]Cl—CuCl$_2$ (1:1.3) | 0.4 | 0.002072 |
| [OMIM]Cl—CuCl$_2$ (1:1.6) | 0.4 | 0.002553 |
| CuCl$_2$ | — | 0.001567 |

TABLE 9

Activated carbon systems according to the invention produced and conventional CuCl$_2$ salt impregnation on mesoporous activated carbon adsorbents using ultrasound treatment
Activated carbon support (mesoporous)

| AC impregnation | Degree of fill α of the pores (ml of IL/ml of pore) | n of Cu (mol)/m of AC (g) |
|---|---|---|
| [OMIM]Cl—CuCl$_2$ (1:1.3) | 0.2 | 0.001103 |
| [OMIM]Cl—CuCl$_2$ (1:1.3) | 0.4 | 0.002211 |

5. Further Examples of the Loading of Various Base Support Materials with Metal-Containing Ionic Liquid (IL) and Various Comparisons Various porous particulate support materials
(1) based on the microporous and mesoporous activated carbon used according to the invention (invention),
(2) based on silicon dioxide (comparison),
(3) based on zeolite (comparison),
(4) based on aluminum oxide (comparison) and
(5) based on ion exchangers (comparison)
were in each case treated or impregnated with metal-containing ionic liquid (IL) of the [EMIM]Cl—CuCl$_2$ (1:1.3) type (see above), in each case at the same degree of fill of the pores.

The adsorbents produced in this way were subsequently immobilized in a manner known per se on a gas-permeable three-dimensional support in the form of an open-pored reticulated polyurethane foam. This support loaded with adsorbents served as filter material (in each case cylindrical test specimens having diameters of 10 cm and heights of 30 cm) in the subsequent breakthrough experiments.

Further comparative filter materials were produced using adsorbents
(6) based on a microporous and mesoporous activated carbon with ABEK impregnation (comparison) and
(7) based on a microporous and mesoporous activated carbon without any impregnation (comparison).

Under the abovementioned experimental conditions, breakthrough times were in each case determined for different harmful gases (NH$_3$, H$_2$S and Cl$_2$) under the above-described conditions. The values are shown in table 10 below.

TABLE 10

Breakthrough times in comparison with filter materials comprising various adsorbents

| Adsorbent | Average breakthrough time/min for NH$_3$ | Average breakthrough time/min for H$_2$S | Average breakthrough time/min for Cl$_2$ |
|---|---|---|---|
| (1) Activated carbon, IL-impregnated (invention) | 522 | 489 | 493 |
| (2) Silicon dioxide (comparison) | 89 | 72 | 55 |
| (3) Zeolite (comparison) | 243 | 212 | 198 |
| (4) Aluminum oxide (comparison) | 134 | 121 | 112 |
| (5) Ion exchanger (comparison) | 232 | 197 | 209 |
| (6) Activated carbon, ABEK-impregnated (comparison) | 467 | 398 | 389 |
| (7) Activated carbon, not impregnated (comparison) | 228 | 189 | 276 |

The results show that the best values in respect of all gases are obtained using the adsorbents or filter materials which have been modified according to the invention. The adsorbents or filter materials modified according to the invention are, despite identical impregnation, significantly superior in terms of the adsorption performance to other adsorbents based on different base or support materials (silicon dioxide (2), zeolite (3), aluminum oxide (4) and ion-exchange resin (5)), and this for various gases. The performance of the adsorbents or filter materials modified according to the invention even exceeds the adsorption capability of identical parent activated carbon but with ABEK impregnation (6) and of identical parent activated carbon without any impregnation (7).

6. Gas Treatment for Clean Room Conditions

Iodine-impregnated activated carbons are often used for gas treatment under clean room conditions in the prior art. In the present experiment, such an iodine-impregnated activated carbon (hereinafter: "AC$_{iodide}$") was compared with a microporous and mesoporous activated carbon used according to the invention with an impregnation based on a metal-containing ionic liquid (IL) with ternary metal modification Zn/Sn/Cu of the [EMIM]Ac—ZnAc$_2$/[EMIM]Ac—SnAc$_2$/[EMIM]Cl—CuCl$_2$ type, where "Ac"=acetate (hereinafter: "AC$_{IL-Zn/Sn/Cu}$"). A microporous and mesoporous activated carbon with conventional metal salt impregnation based on a ternary metal modification Zn/Sn/Cu of the ZnAc$_2$/SnAc$_2$/CuCl$_2$ type, where "Ac"=acetate, and thus without ionic liquid (IL) (hereinafter: "AC$_{Zn/Sn/Cu}$") served as further comparison.

The various adsorbents were subsequently immobilized in a manner known per se on a gas-permeable three-dimensional support in the form of an open-pored reticulated polyurethane foam. This support loaded with adsorbents served as filter material (in each case cylindrical test specimens having diameters of 10 cm and heights of 30 cm) in the subsequent experiments.

Under the abovementioned experimental conditions, the adsorption behavior was in each case determined for different harmful gases (SO$_2$, NO$_x$ and H$_2$S, in each case 1000 ppm input concentration) under the above-described conditions.

In the case of the filter material "AC$_{IL-Zn/Sn/Cu}$" according to the invention, the concentration of all harmful gases could be reduced to below the detection limit. Even after a test time of 5 hours, there was no change in this state. In a subsequent desorption experiment, no liberation of harmful gases was observed after an operating time of 5 hours.

In the case of the comparative filter material "AC$_{iodide}$", on the other hand, the concentration of only the sulfur oxide and nitrogen oxides could be reduced to below the detection limit, while the hydrogen sulfide was not adsorbed to a sufficient extent. Even after a test time of 3 hours, liberation of iodide could be observed. In a subsequent desorption experiment, significant amounts of the harmful gases and also iodide were liberated after an operating time of 5 hours.

In the case of the comparative filter material "AC$_{Zn/Sn/Cu}$", the concentration of all harmful gases could initially be reduced to below the detection limit; however, firstly the hydrogen sulfide content but then also the content of sulfur oxides and nitrogen oxides could no longer be reduced to below the detection limit after a test time of 3.5 hours. In a subsequent desorption experiment, small but detectable amounts of the harmful gases were liberated after an operating time of 5 hours.

The results show that the adsorbents or filter materials modified according to the invention gave the best values in respect of all gases; only these ensure permanent or irreversible and efficient sorption over the entire time of the experiment, and this without liberation of iodine and without desorption of the harmful gases.

7. Use in Air Filters

A microporous and mesoporous activated carbon used according to the invention was treated or impregnated with a metal-containing ionic liquid (IL) of the [EMIM]Cl—$CuCl_2$ type (1:1.3) (see above). The adsorbents modified in this way were subsequently immobilized in a manner known per se on a gas-permeable three-dimensional support in the form of an open-pored reticulated polyurethane foam which was then integrated into or installed in an air purification device. In a corresponding way, a conventional activated carbon was, in order to provide comparative materials, immobilized on a gas-permeable support as described above and this was then likewise integrated into or installed in a corresponding air purification device. The supports loaded with adsorbents in each case thus served as filter material in the following experiments.

a) The air purification devices were in each case introduced into a room contaminated with polychlorinated biphenyls (PCB) (PCB concentration: 10 000 $ng/m^3$) and started up. After a period of operation of only 1 hour, the PCB concentration in the air of the room could be reduced to a value of less than 300 $ng/m^3$ in the case of the air purification apparatus provided with the filter material according to the invention and remained at this value during the period of operation. In the subsequent desorption experiment, no significant amounts of PCB were found. In the case of the air purification device provided with the comparative material, the PCB concentration in the air of the room could be reduced to a value of about 1200 $ng/m^3$ after operation for 1 hour; in the subsequent desorption experiment, the reversibility of the adsorption was more than 95% (i.e. more than 95% of the previously adsorbed PCB was liberated again).

b) In addition, the respective air purification devices were examined in an $H_2S$ flow-through test. For this purpose, the bed height of the support used (open-pored reticulated polyurethane foam) with the adsorbents immobilized thereon was in each case 40 mm. The concentration of $H_2S$ in the stream of air was 10 ppm, and the flow velocity was set to 0.73 m/s. The efficiency over more than 1200 minutes was 80%. In the case of the conventional material, the efficiency was less than 10%.

8. Catalysis of Chemical Reactions

Activated carbons used according to the invention with modification or impregnation based on metal-containing ionic liquid (IL) of various types with varying metal compounds were tested in the catalysis of various chemical reactions (i.e. hydrogenation reactions, oxidation reactions and also oligomerization and polymerization reactions) and gave excellent results there.

a) Preparation of an Activated Carbon Modified According to the Invention for Use in the Catalytic Hydrogenation of Ethene A microporous/mesoporous activated carbon or a mesoporous activated carbon, as have each been described above for example 1b), was used as support material for producing the activated carbon used according to the invention.

A solution of the complex $RhCl(PPh_3)_3$ in the ionic liquid in the form of 1-ethyl-3-methylimidazolium bis(trifluoromethylsulfonyl)imide was firstly produced. For this purpose, 200 mg of $RhCl(PPh_3)_3$ were dissolved in 30 ml of the ionic liquid while stirring at 50° C. The ionic catalyst solution obtained in this way was used for impregnating the respective activated carbon absorbents, with this being carried out with introduction of ultrasound. The non-steady-state or discontinuous introduction of energy by the ultrasonic probe enabled improved distribution of the ionic catalyst solution in the fine pore structure of the activated carbon support to be ensured.

To produce the catalytically active activated carbon according to the invention, the appropriate amount of ionic catalyst solution required for attaining a particular degree of fill α of the pores in a defined amount of the activated carbon absorbent was firstly calculated. The degree of fill α of the pores was calculated according to the formula $[\alpha=V_{IL}/(V_{pore} \cdot m_{support})]$, where, in the formula, "$V_{IL}$" is the volume of the ionic liquid to be used, "$m_{support}$" is the mass of the activated carbon to be used and "$V_{pore}$" is the specific pore volume of the activated carbon. A degree of fill α of the pores of 0.2 was used for the experiment.

The ionic catalyst solution was weighed into a Schlenk flask and dissolved in ethanol while stirring at room temperature. The previously calculated amount of activated carbon absorbent was then introduced into the solution. The mixture was stirred for a further 15 minutes and subsequently placed for 2 hours in a water bath with ultrasonic probe dipping in.

After the impregnation of the activated carbon support carried out in this way, the solvent ethanol was separated off at T=40° C. and p=175 mbar on a rotary evaporator and the subsequent final drying was carried out overnight at T=60° C. under a high vacuum on an oil bath.

The resulting catalytic activated carbon absorbent which had been impregnated according to the invention was subsequently brought into contact with a gaseous mixture of ethene and hydrogen at T=80° C. in a reaction tube. The total pressure of the gas mixture was 10 bar, and the residence time in the reactor was 60 seconds. Under these reaction conditions, a reaction conversion of 20% of the ethene used in the outflowing gas was observed for the microporous/mesoporous activated carbon modified according to the invention and a value of 22% was observed for the mesoporous activated carbon which had been modified according to the invention. The sole product of the catalytic hydrogenation in the presence of the respective catalytic activated carbon absorbent which had been impregnated according to the invention was ethane.

b) Comparative Example: Preparation of an Activated Carbon which has not been Modified According to the Invention—Modification of the Activated Carbon with the Physisorbed Complex $RhCl(PPh_3)_3$ without Use of an Ionic Liquid and Testing of the Material in the Catalytic Hydrogenation of Ethene A microporous/mesoporous activated carbon or a mesoporous activated carbon, as have been described in each case for example 1 b), was used as support material for producing the noninventive activated carbon.

A solution of the complex $RhCl(PPh_3)_3$ in ethanol was firstly produced. For this purpose, 200 mg of $RhCl(PPh_3)_3$ were dissolved in 30 ml of ethanol while stirring at 50° C. The catalyst solution obtained in this way was used for impregnating the activated carbon absorbents, with this being carried out with introduction of ultrasound. To produce the respective noninventive comparative samples, the same amount of the complex $RhCl(PPh_3)_3$ and the same amount of activated carbon absorbent as in example (a) were used. The ethanolic solution of the complex was mixed with the weighed amount of activated carbon absorbent. The mixture was stirred for a further 15 minutes and subsequently placed for 2 hours in a water bath with ultrasonic probe dipping in. After the impregnation of the activated carbon support carried out in this way, the solvent ethanol was separated off at T=40° C. and p=175 mbar on a rotary evaporator and the subsequent final drying was carried out overnight at T=60° C. under a high vacuum on an oil bath.

The resulting activated carbon absorbent which had been impregnated in a noninventive manner was subsequently brought into contact with a gaseous mixture of ethene and hydrogen at 80° C. in a reaction tube. The total pressure of the gas mixture was 10 bar, and the residence time in the reactor was 60 seconds. Under these reaction conditions, a reaction conversion of less than 1.0% of the ethene used in the outflowing gas was observed both for the noninventive microporous/mesoporous activated carbon and for the noninventive mesoporous activated carbon. The sole detectable reaction product was ethane.

c) Preparation of an Activated Carbon Modified According to the Invention for the Catalytic Reaction of Methanol, CO and Oxygen to Form Dimethyl Carbonate and Comparison of the Activated Carbon Modified According to the Invention with Identical Catalytic Components on Other Support Materials This example comprises a comparison of the activated carbon modified according to the invention with other support materials which have likewise been coated with a catalytically active, metal-containing ionic liquid. The catalytic reaction of methanol, CO and oxygen to form dimethyl carbonate was selected as comparative use. Dimethyl carbonate is used industrially as methylating reagent, fuel additive or solvent, and the preparation of the compound from methanol, CO and oxygen is of great industrial interest.

For the production of the material according to the invention and all comparative materials, the catalytically active, metal-containing ionic liquid [Cu(C$_{12}$IM)$_2$][CuBr$_2$] was prepared and dissolved in ethanol. 0.5 g of the ionic liquid and 30 ml of ethanol were used for the solution.

A microporous/mesoporous activated carbon or a mesoporous activated carbon, as have in each case been described above for example 1b), were again used as support material for producing the activated carbon used according to the invention.

To produce the catalytically active activated carbon according to the invention and the comparative samples using a silicate support (comparative sample 1), a magnesium oxide support (comparative sample 2) and a polymer support (PMMA/PS, comparative sample 3), the appropriate amount of ionic catalyst solution required for establishing the degree of fill α of the pores in a defined amount of the activated carbon absorbent was firstly calculated. The degree of fill α of the pores was calculated according to the formula [α=V$_{IL}$/(V$_{pore}$·m$_{support}$)], where, in the formula, "V$_{IL}$" is the volume of the ionic liquid to be used, "m$_{support}$" is the mass of the activated carbon to be used and "V$_{pore}$" is the specific pore volume of the activated carbon. A degree of fill α of the pores of 0.2 was used for all experiments in example (c).

The ethanolic solution of the ionic catalyst solution was weighed into a Schlenk flask and the previously calculated amount of the respective support material was introduced into the solution. The mixture was stirred for a further 15 minutes and subsequently placed for 2 hours in a water bath with ultrasonic probe dipping in.

After the impregnation of the support material carried out in this way, the solvent ethanol was in all cases separated off at T=40° C. and p=175 mbar on a rotary evaporator, and the subsequent final drying was carried out overnight at T=60° C. under a high vacuum on an oil bath.

The resulting catalytic activated carbon absorbent which had been impregnated according to the invention and the three comparative samples were subsequently used in a reaction tube for the continuous reaction of methanol, CO and oxygen to form dimethyl carbonate. In all experiments in example (c), the following, identical reaction conditions and ratios were used: reaction temperature 110° C.; residence time in the tube reactor through which flow occurred 180 s, p$_{air}$=2.35 bar (p$_{nitrogen}$=1.88 bar, p$_{oxygen}$=0.47 bar); p$_{co}$=5.03 bar, p$_{methanol}$=0.27 bar.

Under these reaction conditions, steady-state operation of the reactor was attained using the respective catalytic activated carbon absorbent which had been impregnated according to the invention and the three comparative samples after operation for 3 hours, and this could be maintained for at least 20 hours.

In steady-state operation, the following yields of the desired product dimethyl carbonate were obtained:

| Catalyst system/support material | Yield of dimethyl carbonate in steady-state operation of the reactor under the abovementioned conditions |
|---|---|
| Catalytic activated carbon absorbent based on microporous/mesoporous activated carbon which has been impregnated according to the invention | 23% |
| Catalytic activated carbon absorbent based on mesoporous activated carbon which has been impregnated according to the invention | 25% |
| Comparative sample 1: Silica as support | 0.2% |
| Comparative sample 2: Magnesium oxide as support | 1.1% |
| Comparative sample 3: Polymer (PMMA/PS) as support | 2.9% |

The experiments show that the catalytic activated carbon absorbent which has been impregnated according to the invention is far superior to other impregnated support materials in respect of activity and catalytic efficiency.

The invention claimed is:

1. Activated carbon particles comprising an activated carbon provided with catalytic or reactive constituents,
   wherein the activated carbon is in the form of discrete activated carbon particles having a spherical or grain shape, where the activated carbon has particle sizes in the range from 0.01 to 2 mm, as determined according to the method of ASTM D2862-97/04;
   wherein the activated carbon has a total pore volume in the range from 0.7 to 2.5 cm$^3$/g, wherein from 30% to 85% of the total pore volume of the activated carbon is formed by pores having pore diameters in the range from 2 nm to 50 nm;
   wherein the activated carbon has a specific BET surface area in the range from 500 m$^2$/g to 3,500 m$^2$/g;
   wherein the activated carbon is provided with at least one metal component, wherein the metal component comprises at least one metal-containing ionic liquid (IL)

comprising at least one metal compound dissolved or dissociated in the ionic liquid (IL), wherein the metal compound comprises at least one metal selected from the group consisting of Cu, Ag, Au, Zn, Hg, Sn, Ce, Ti, Zr, V, Nb, Cr, Mo, W, Mn, Fe, Ru, Os, Co, Rh, Ir, Ni, Pd and Pt;

wherein the ionic liquid (IL) is selected from the group consisting of:
(i) compounds of the general formula $[Cat]^{n+}[An]^{n-}$ where "Cat" is a cation and "An" is an anion and "n" is an integer equal to 1 or 2; and
(ii) compounds of the general formula $[Cat_1]_x^{y+}[An_1]_y^{x-}$ where "$Cat_1$" is a cation and "$An_1$" is an anion and "x" and "y" are each, independently of one another, an integer in the range from 1 to 4, where the cation of the ionic liquid (IL) is selected among nitrogen-containing cations selected from the group consisting of quaternary ammonium cations, imidazolium cations, pyridinium cations, pyrazolium cations and triazinium cations and phosphorus-containing cation in the form of a phosphonium cation and where the anion of the ionic liquid (IL) is an organic or inorganic anion; and wherein the activated carbon comprises the metal-containing ionic liquid (IL) in amounts of from 1% by volume to 70% by volume, based on the volume of the activated carbon; or wherein the amount of metal-containing ionic liquid (IL), determined as the pore-filling degree α, is such that 20% to 95% of the pore volume of the activated carbon is not filled with the metal-containing ionic liquid (IL), wherein the pore-filling degree α is determined according to the formula $[\alpha=V_{IL}/(V_{pore} \cdot m_{support})]$, wherein "$V_{IL}$" designates the volume of the ionic liquid to be used, "$m_{support}$" designates the mass of the activated carbon to be used and "$V_{pore}$" designates the specific pore volume of the activated carbon.

2. The activated carbon particles as claimed in claim 1, wherein the metal component includes the metal in a positive oxidation state, wherein the oxidation state of the metal lies in the range from +I to +VII.

3. The activated carbon particles as claimed in claim 1, wherein the metal component includes at least one metal selected from the group of Zn, Ag, Sn, Ni and Cu.

4. The activated carbon particles as claimed in claim 1, wherein the metal component includes an organic or inorganic metal salt, based on the metal, wherein the salt is selected from the group of halide salts, sulfates, sulfides, sulfites, nitrates, nitrites, phosphates, phosphides, phosphites, carbamates, alkoxides and carboxylic acid salts.

5. The activated carbon particles as claimed in claim 1, wherein the metal component includes the metal compound selected from the group of nickel chloride, copper chloride, zinc acetate and tin acetate.

6. The activated carbon particles as claimed in claim 1, wherein the ionic liquid (IL) contains the metal in amounts of 0.001 wt % to 80 wt %, based on the ionic liquid (IL) and calculated as metal.

7. The activated carbon particles as claimed in claim 1, wherein the ionic liquid (IL) contains the metal in a molar mass fraction ranging from 1% to 90%, based on the ionic liquid (IL) and calculated as metal.

8. The activated carbon particles as claimed in claim 1, wherein the molar ratio of ionic liquid (IL) to metal "[ionic liquid (IL) : metal]" lies in the range from [10:0.1] to [0.1:10].

9. The activated carbon particles as claimed in claim 1, wherein the activated carbon includes the metal-containing ionic liquid (IL) in amounts of 2 vol % to 60 vol %, based on the volume of the activated carbon.

10. The activated carbon particles as claimed in claim 1, wherein the activated carbon, with respect to the metal-containing ionic liquid (IL), has a pore-filling degree α of 0.05 to 0.8, wherein the pore-filling degree α is determined according to the formula $[\alpha=V_{IL}/(V_{pore} \cdot m_{support})]$.

11. The activated carbon particles as claimed in claim 1, wherein the pore-filling degree and the amount of metal-containing ionic liquid (IL) are determined such that 30% to 90% of the pore volume of the activated carbon is not filled with the metal-containing ionic liquid (IL).

12. A process for producing activated carbon particles as claimed in claim 1,
wherein the process comprises the step of providing activated carbon particles with at least one metal component wherein the metal component comprises at least one metal-containing ionic liquid (IL) comprising at least one metal compound dissolved or dissociated in the ionic liquid (IL), wherein the metal compound comprises at least one metal selected from the group consisting of Cu, Ag, Au, Zn, Hg, Sn, Ce, Ti, Zr, V, Nb, Cr, Mo, W, Mn, Fe, Ru, Os, Co, Rh, Ir, Ni, Pd and Pt, wherein a plurality of discrete activated carbon particles having a spherical or grain shape are brought into contact with the ionic liquid (IL);

wherein the activated carbon particles used as a starting material have particle sizes in the range from 0.01 to 2 mm, as determined according to the method of ASTM D2862-97/04, and wherein the activated carbon has a total pore volume in the range from 0.7 to 2.5 cm³/g, wherein from 30% to 85% of the total pore volume of the activated carbon is formed by pores having pore diameters in the range from 2 nm to 50 nm;

wherein the activated carbon has a specific BET surface area in the range from 500 m²/g to 3,500 m²/g;

wherein the ionic liquid (IL) is selected from the group consisting of:
(i) compounds of the general formula $[Cat]^{n+}[An]^{n-}$ where "Cat" is a cation and "An" is an anion and "n" is an integer equal to 1 or 2; and
(ii) compounds of the general formula $[Cat_1]_x^{y+}[An_1]_y^{x-}$ where "$Cat_1$" is a cation and "$An_1$" is an anion and "x" and "y" are each, independently of one another, an integer in the range from 1 to 4, where the cation of the ionic liquid (IL) is selected among nitrogen-containing cations selected from the group consisting of quaternary ammonium cations, imidazolium cations, pyridinium cations, pyrazolium cations and triazinium cations and phosphorus-containing cation in the form of a phosphonium cation and where the anion of the ionic liquid (IL) is an organic or inorganic anion; and wherein the resulting activated carbon particles provided with at least one metal component comprise the metal-containing ionic liquid (IL) in amounts of from 1% by volume to 70% by volume, based on the volume of the activated carbon; or wherein the amount of metal-containing ionic liquid (IL), determined as the pore-filling degree of the resulting activated carbon particles provided with at least one metal component, is such that 20% to 95% of the pore volume of the activated carbon particles is not filled with the metal-containing ionic liquid (IL), wherein the pore-filling degree α is determined according to the formula $[\alpha=V_{IL}/(V_{pore} \cdot m_{support})]$, wherein "$V_{IL}$"

designates the volume of the ionic liquid to be used, "$m_{support}$" designates the mass of the activated carbon to be used and "$V_{pore}$" designates the specific pore volume of the activated carbon.

13. The process as claimed in claim 12, wherein the process comprises the following steps in the order (a) to (c) specified below:
(a) providing at least one metal component based on a metal-containing ionic liquid (IL) comprising at least one metal compound dissolved or dissociated in the ionic liquid (IL), wherein the metal compound comprises at least one metal selected from the group consisting of Cu, Ag, Au, Zn, Hg, Sn, Ce, Ti, Zr, V, Nb, Cr, Mo, W, Mn, Fe, Ru, Os, Co, Rh, Ir, Ni, Pd and Pt, wherein the at least one metal is brought into contact with an ionic liquid (IL);
(b) contacting the activated carbon particles with the metal component based on the metal-containing ionic liquid (IL) obtained in step (a); and
(c) removing or separating off the metal-containing ionic liquid (IL) not been taken up by the activated carbon particles or used in excess.

14. A protective material for use in the civilian or military sector and in the form of protective clothing selected from protective suits, protective gloves, protective shoes, protective socks, protective headwear and protective coverings, wherein the protective material comprises activated carbon particles as claimed in claim 1.

15. A filter or filter material for the removal of harmful, odorous and poisonous substances from streams of gas, wherein the filter or filter material is selected from protective mask filters, odor filters, large-area filters, air filters, filters for purification of the air of a room, adsorptive support structures and filters for the medical sector, wherein the filter or filter material comprises activated carbon particles as claimed in claim 1.

* * * * *